US012237631B2

(12) United States Patent
Choi

(10) Patent No.: US 12,237,631 B2
(45) Date of Patent: Feb. 25, 2025

(54) POWER ADAPTER

(71) Applicant: Design Narrative Ltd., Glasgow (GB)

(72) Inventor: Min-Kyu Choi, Kingston Upon Thames Surrey (GB)

(73) Assignee: Hyphenate, Inc., Seoul (KR)

( * ) Notice: Subject to any disclaimer, the term of this patent is extended or adjusted under 35 U.S.C. 154(b) by 169 days.

(21) Appl. No.: 17/287,784

(22) PCT Filed: Oct. 25, 2019

(86) PCT No.: PCT/GB2019/053031
§ 371 (c)(1),
(2) Date: Apr. 22, 2021

(87) PCT Pub. No.: WO2020/084314
PCT Pub. Date: Apr. 30, 2020

(65) Prior Publication Data

US 2021/0384686 A1 Dec. 9, 2021

(30) Foreign Application Priority Data

Oct. 26, 2018 (GB) ..................................... 1817491

(51) Int. Cl.
*H01R 31/06* (2006.01)
*H01R 13/08* (2006.01)
(Continued)

(52) U.S. Cl.
CPC ............. *H01R 31/06* (2013.01); *H01R 13/08* (2013.01); *H01R 13/502* (2013.01); *H01R 33/06* (2013.01); *H01R 2103/00* (2013.01)

(58) Field of Classification Search
CPC ........ H01R 31/06; H01R 13/08; H01R 13/44; H01R 13/4538; H01R 13/645;
(Continued)

(56) References Cited

U.S. PATENT DOCUMENTS 5,611,701 A * 3/1997 Hahn .................... H02J 7/0042 439/131
5,613,863 A * 3/1997 Klaus ..................... H01R 31/06 D13/110
(Continued)

FOREIGN PATENT DOCUMENTS

GB 2461324 A 12/2009
GB 2522805 A 8/2015

OTHER PUBLICATIONS

International Search Report for International Application No. PCT/GB2019/053031, dated Apr. 3, 2020.
(Continued)

*Primary Examiner* — Thanh Tam T Le
(74) *Attorney, Agent, or Firm* — Kim IP Law Group LLC

(57) ABSTRACT

The invention relates to a power adapter comprising a first prong (12) rotatable between a stowed configuration and a deployed configuration; and a second prong (13, 14) rotatable in an opposing direction between a stowed configuration and a deployed configuration. A deployment mechanism associated with the first and second prongs (12, 13, 14) causes their movement between the stowed and the deployed configurations. The deployment mechanism comprises a cam (see FIG. 10) coupled to at least one of the first and second prongs (12, 13, 14) and arranged to act on the other prong such that movement of the cam translates to rotation of the prongs. It will be appreciated that the invention provides for a collapsible power adapter which is smaller, more user friendly and cost effective than conventional power adapters.

18 Claims, 25 Drawing Sheets

(51) Int. Cl.
*H01R 13/502* (2006.01)
*H01R 33/06* (2006.01)
*H01R 103/00* (2006.01)

(58) Field of Classification Search
CPC ...... H01R 13/502; H01R 27/00; H01R 33/06; H01R 2103/00
See application file for complete search history.

(56) References Cited

U.S. PATENT DOCUMENTS

| | | | | | |
|---|---|---|---|---|---|
| 5,628,641 | A * | 5/1997 | Hahn | H01R 27/00 | 439/131 |
| 5,713,719 | A * | 2/1998 | Fiore | F04D 29/426 | 415/113 |
| 5,791,921 | A * | 8/1998 | Lee | H01R 27/00 | 439/651 |
| 5,967,807 | A * | 10/1999 | Wu | H01R 31/06 | 439/131 |
| 6,042,400 | A * | 3/2000 | Queffelec | H01R 13/44 | 439/131 |
| 6,939,150 | B1 * | 9/2005 | Lanni | H01R 35/04 | 439/174 |
| 7,052,298 | B1 * | 5/2006 | Cheng | H01R 31/065 | 439/651 |
| 7,354,286 | B1 * | 4/2008 | Lee | H01R 13/652 | 439/652 |
| 7,604,492 | B1 * | 10/2009 | Wang | H01R 24/30 | 439/131 |
| 7,614,892 | B2 * | 11/2009 | Klant | H01R 31/06 | 439/172 |
| 7,798,825 | B1 * | 9/2010 | Pai | H01R 31/06 | 439/131 |
| 8,790,124 | B2 * | 7/2014 | Lee | H01R 31/06 | 439/131 |
| 9,077,093 | B1 * | 7/2015 | Roy | H02K 49/10 | |
| 9,331,441 | B2 * | 5/2016 | Roy | H01R 24/68 | |
| 9,564,720 | B2 * | 2/2017 | Zhang | H01R 24/30 | |
| 10,181,671 | B2 * | 1/2019 | Ma | H01R 24/30 | |
| 10,992,093 | B1 * | 4/2021 | Lee | H01R 31/06 | |

OTHER PUBLICATIONS

Written Opinion for International Application No. PCT/GB2019/053031, dated Apr. 3, 2020.

Korean Intellectual Property Office, Written Opinion issued in counterpart application No. 1020217015956 issued on Jul. 23, 2024.

* cited by examiner 915
969
911
910

Slot in lock in

Push to deploy the prongs 912
913
914

969
911
961
910
919
915

Open cam with torsion spring

Open cam with torsion spring

Open cam with torsion spring

POWER ADAPTER

CROSS-REFERENCE TO RELATED APPLICATIONS

This application is a U.S. national phase application under 35 U.S.C. § 371 of International Application No. PCT/GB2019/053031, filed on Oct. 25, 2019, which claims priority to GB Patent Application No. 1817491.2 filed on Oct. 26, 2018, the disclosures of each of which are hereby incorporated by reference in their entirety for all purposes.

FIELD OF THE INVENTION

The present invention relates to power adapters, particularly, but not exclusively, collapsible electrical power adapters for use with standard alternating current (AC) power sockets.

BACKGROUND OF THE INVENTION

Electrical power adapters are used to supply power from an electrical wall outlet or other power source, to electronic devices for a wide variety of applications. Advances in technology increasingly result in a more compact design of portable electronic devices such as watches, smart-phones, tablets and laptops. These portable electronic devices are often packaged and shipped alongside the power adapter required to supply power to the device. There is a requirement for the accompanying power adapters to have reduced dimensions in order to decrease logistics costs for manufacturers and distributors. In response to this demand, collapsible power adapters with selectively retractable prongs have been designed. However, there is a need for these collapsible power adaptors to be increasingly; smaller, robust, safe, user friendly and cost effective. It is an object of the present invention to provide at least one of the aforementioned solutions.

BRIEF SUMMARY OF THE INVENTION

According to a first aspect of the invention, there is provided a power adapter comprising:

- a first prong rotatable between a stowed configuration and a deployed configuration;
- a second prong rotatable in an opposing direction between a stowed configuration and a deployed configuration;
- a deployment mechanism associated with the first and second prongs to cause movement of the prongs between the stowed and the deployed configurations; and
- wherein the deployment mechanism comprises a cam coupled to at least one of the first and second prongs and arranged to act on the other second or first prong such that movement of the cam translates to rotation of the prongs.

Optionally, the deployment mechanism is arranged such that rotation of the first and second prongs is substantially simultaneous.

'Substantially simultaneous' as used herein in relation to movement of the prongs is taken to mean resultant movement of all of the prongs following a single actuation event and can include any synchronised movement of the prongs with a short time delay as well as contemporaneous movement.

The cam may be movable in a linear manner. Optionally, the cam is arranged within the power adapter to move along a linear path. Optionally, the cam is coupled to and/or is arranged to act on the first and second prongs at a location offset from an axis of rotation of each of the prongs.

The cam may be coupled to one of the first and/or second prongs and act on the other prong to move the prong from the stowed to the deployed configuration. Optionally, the cam may be provided with a cam surface arranged to act on one of the first or second prongs to guide movement of that prong from the stowed to the deployed configuration. Optionally, the cam surface may be substantially curved or arcuate to guide movement of at least one of the prongs along a predetermined path.

The deployment mechanism may further comprise a biasing means associated with at least one of the prongs to urge movement of the prong into a particular configuration. Optionally, at least one of the prongs may be provided with a biasing means to return the prong to a particular configuration when the cam is not acting directly on the prong.

Thus, the deployment mechanism may comprise a sliding cam for deployment of the first and second prongs and a spring return for movement of the at least one prong from the deployed to the stowed configuration.

Alternatively, the cam may be coupled to both the first and second prongs to control rotational movement of the prongs between the stowed and deployed configurations. Thus, the cam may be directly coupled to all prongs to directly translate the linear movement of the cam to rotational movement of each prong.

At least one of the first and second prongs may be provided with protrusions for interaction with the cam. At least one of the first and second prongs may be provided with protrusions for directly coupling with the cam of the deployment mechanism. All prongs may be provided with protrusions for directly engaging and/or interacting with the cam of the deployment mechanism.

Optionally, the cam may be biased into a particular position. Optionally, the deployment mechanism may comprise a resilient means arranged to act on the cam and bias the cam into a particular position. Optionally, the biasing means may comprise a flipping and/or tipping spring or any other appropriate spring.

The cam may comprise at least one prong coupling means. The prong coupling means may comprise recesses for accommodating at least part of a prong. The cam may be an integral component with a plurality of prong coupling means. Thus, the cam may be a single component with a plurality of coupling means to directly engage the prongs and/or arcuate cam surfaces to interact with the prongs.

The cam provides a highly effective deployment mechanism for simultaneous deployment of the prongs. The cam is advantageous compared with conventional solutions, since it is a robust component that is capable of achieving deployment of the prongs without the need for a plurality of moving parts. The small number of parts results in a product that has low material costs and tooling costs for manufacture and assembly.

The power adapter may comprise a housing. The housing may be arranged to contain the deployment mechanism and retain the first and second prongs. The housing may define recesses and the first and second prongs may be accommodated within the recesses in the stowed configuration such that the prongs remain within an area defined by the housing in the stowed configuration. It is advantageous to have prongs fully retracted and stowed within an area defined by the housing so that the prongs do not protrude outwith the housing, in order to minimise the accompanying potential for snagging, breaking or forced deployment of the prongs when the power adapter is not in use.

Optionally, the power adapter further comprises an actuation mechanism to actuate movement of the first and second prongs between the stowed and the deployed configurations. The actuation mechanism may be actuable by a user.

Optionally, the actuation mechanism is arranged to actuate the deployment mechanism. The actuation mechanism may be directly coupled to the deployment mechanism to cause movement of the first and second prongs on actuation thereof.

Optionally, the actuation mechanism is spaced from the first and second prongs, such that actuation is initiated by a user without any requirement to directly contact the first and second prongs. This increases safety of the power adapter as well as removing design constraints since no direct access to the prongs is required.

The actuation mechanism may include, but is not limited to, any of the following; relative movement of two adapter components, a push switch, and/or a slide switch.

The power adapter may comprise at least two parts and the actuation mechanism may include relative movement of at least two of the parts. The power adapter may comprise a first part and a second part, wherein each of the first and the second parts have a respective housing. In the deployed configuration, the housing of the first and second parts may be arranged to form a substantially cuboid shape.

The first part may comprise the first and second prongs and the deployment mechanism. The second part may comprise electronics and an electrical output. The second part may comprise an adapter. The second part may comprise any type of electrical connector including, but not limited to any international type adapter, for example a type A, type I or type C adapter. Such adapter may also include movable prongs.

The first and second parts may be selectively electrically coupled. The first and second parts may be movably coupled, such that relative movement of the first and second parts causes actuation of the deployment mechanism.

The power adapter may comprise a coupling or interconnection means between the first and second parts, such that the first and second parts are slidable relative to one another.

The coupling or interconnection means between the first and second parts may be an electrical and a mechanical coupling. The mechanical coupling may be a retaining coupling to maintain the two parts proximate one another and in contact. Alternatively, the mechanical component may be a releasable coupling to enable complete detachment of the two parts. Optionally, the mechanical coupling locks the first and second parts together in the deployment configuration such that the two parts are inseparable when the prongs are deployed and in use in a complementary socket. This is an advantageous safety feature.

Optionally, the first part and the second part are electrically coupled when the prongs are in the deployed configuration.

Optionally, the power adapter is configured such that the output is electrically decoupled from the prongs in the stowed configuration.

The coupling may include at least one slot and cooperable key. The key may be formed from a material that acts as a conductor.

The first part may be a plug part and the second part may be an adapter part.

The power adapter may be a collapsible electrical power adapter.

Preferably the prongs extend outwardly from the adapter in the deployed configuration. The prongs may extend perpendicular to a face of the adapter in the deployed configuration.

Preferably, the power adapter is compatible with and insertable within power sockets, when the prongs are in the deployed configuration. The power adapter may be arranged for releasable coupling with a power socket when the prongs are in the deployed configuration. The power socket may be a standard alternating current (AC) power socket. The power socket may include any power socket that has at least two slots for receiving compatible first and second prongs.

The first prong may be rotatable around a first axis. Rotation from the stowed to the deployed configuration may be in a first direction. Optionally, the first prong is configured to be coupled to a ground potential. The first prong may be an earth pin.

The at least one second prong may be rotatable around a second axis. The at least one second prong may be rotatable from the stowed configuration to the deployed configuration in a second direction. There may be two second prongs. The two second prongs may be rotatable around a common axis. The two second prongs may be rotatable around the second axis. The second prongs may be live and neutral prongs.

The deployment mechanism may comprise two cams, wherein each cam is associated with a respective second prong and each cam is arranged to move each second prong from the stowed to the deployed configurations in a coordinated movement.

Alternatively, the deployment mechanism may comprise a single cam component that is coupled to both, or arranged to act on both, of the second prongs for coordinated movement thereof.

Optionally, the power adapter comprises an electrical output. Optionally, the output is configured to transmit power via the prongs to an electric device. Optionally, the electrical output may be arranged to connect with any suitable electrical connection means including but not limited to; two-prong adapter plugs, such as type A, type I, type C plugs and the like, C8 connectors, USB connectors, USB type C connectors, power cables and wires.

The power adapter may be used in conjunction with any electronic device requiring a supply of power.

The prongs of the power adapter may be compatible with any country or region specific design, code or standard. Relative dimensions of the power adapter may be compatible with any country or region specific design, code or standard.

According to a second aspect of the present invention there is provided a power adapter comprising:

a first prong rotatable between a stowed configuration and a deployed configuration;

at least one second prong rotatable in an opposing direction between a stowed configuration and a deployed configuration;

a deployment mechanism for substantially simultaneous movement of the prongs between the stowed and the deployed configurations; and wherein the deployment mechanism has a first portion associated with the first prong and a second portion associated with the at least one second prong, wherein the first and the second portions are structurally separate and act in conjunction with one another to cause substantially simultaneous movement of the prongs.

'Structurally separate' as used herein in relation to the first and second portions of the deployment mechanism can be taken to refer to components of the deployment mechanism that can act on one another but have no direct mechanical interconnections or linkages.

Optionally, in the deployed configuration, the power adapter is capable of interconnection with an electrical power source, such as a socket.

Optionally, the power adapter is contained within a housing and the prongs are contained within an external perimeter defined by the housing when in the stowed configuration.

The first prong and each of the second prongs with associated portions of the deployment mechanism may be structurally separate. Thus, the power adapter may comprise a first prong and two second prongs with an associated portion of the deployment mechanism for movement of the respective prong, and wherein each prong with the associated deployment mechanism may be structurally separate. The lack of direct mechanical linkage between the prongs ensures the power adapter is robust, while retaining essential functionality by permitting simultaneous movement of the prongs.

The first and the second portions of the deployment mechanism may act in conjunction with one another to cause substantially simultaneous deployment of the prongs.

The first portion of the deployment mechanism may be arranged to bias the first prong into the stowed configuration. The second portion of the deployment mechanism may be arranged to bias the at least one second prong into the stowed configuration.

One of the first and second portions of the deployment mechanism may act on another of the second and first portions of the deployment mechanism to cause movement of the prongs from the stowed to the deployed configuration. The second portion of the deployment mechanism may act on the first portion of the deployment mechanism to cause movement of the prongs from the stowed to the deployed configuration.

The second portion of the deployment mechanism may comprise a slidable cam. The power adapter may comprise two second prongs and the second portion of the deployment mechanism may comprise one slidable cam coupled to both the second prongs.

Alternatively, the power adapter may comprise two second prongs, each prong associated with a respective second portion of the deployment mechanism and wherein all of the first and second portions of the deployment mechanism are structurally separate. The, or each, slidable cam may be coupled to the, or each, second prong. The, or each, slidable cam may be directly coupled to the, or each, second prong such that movement of the cam is directly translated to the second prong.

The, or each, slidable cam may act on the first portion of the deployment mechanism coupled to the first prong to cause movement of the first prong from the stowed to the deployed configuration.

The first portion of the deployment mechanism may comprise a biasing means to urge movement of the first prong from the deployed to the stowed configuration. The biasing means may comprise a spring. The biasing means may comprise a torsion spring.

The power adapter may comprise an actuation mechanism. Optionally, the actuation mechanism is arranged to act on the deployment mechanism to cause movement of the at least one prong between the stowed and the deployed configurations.

The actuation mechanism may be coupled to the second portion of the deployment mechanism. The actuation mechanism may be coupled to the, or each, sliding cam.

All features of the first aspect of the invention are equally applicable to the second aspect of the invention.

According to a third aspect of the present invention there is provided a power adapter comprising:

- a plug part including at least two prongs rotatable between a stowed configuration and a deployed configuration;
- an adapter part for providing an electrical output; and
- a movable coupling for selective mechanical and electrical coupling between the adapter part and the plug part, wherein the plug part and the adapter part are movable between a first position in which the prongs are in the stowed configuration and a second position in which the prongs are in the deployed configuration such that movement of the adapter part and the plug part between the first and second positions causes rotation of the prongs between the stowed and deployed configurations.

The plug part may comprise a plug housing having recesses to accommodate the at least two prongs, wherein the prongs are accommodated within an area defined by the plug housing in the stowed configuration.

The adapter part may comprise an adapter housing. The plug housing and the adapter housing may be shaped such that the power adapter is substantially cuboid in the second position, with the prongs deployed and projecting perpendicular to a face of the cuboid.

The plug part and the adapter part may be slidably coupled to one another and slidable between the first and second positions. The power adapter may comprise a slidable coupling to couple the plug part and the adapter part and allow relative movement therebetween. The slidable coupling may comprise at least one key slidable within a slot. The coupling may be a conductive coupling to provide electrical connection between the plug part and adapter part. The at least one key may be composed from a conducting material to provide a conductive coupling between the plug part and the adapter part.

Preferably the plug part comprises a deployment mechanism for moving the prongs between the stowed and deployed configurations. The deployment mechanism can include any and all features hereinbefore described.

Optionally, the plug part comprises a first prong rotatable between the stowed and the deployed configurations and at least one second prong rotatable in an opposing direction between the stowed and deployed configurations.

Optionally, the plug portion contains a fuse.

All features of the first and second aspects of the invention are equally applicable to the third aspect of the invention.

According to another aspect of the invention, there is provided a collapsible power adapter with any combination of features referenced herein.

According to a further aspect of the invention, there is provided a power adapter of the first, second and/or the third aspect of the invention further comprising an electronic device that is electrically connectable with the power adapter.

Any aspect of the invention can be combined with any other aspect, embodiment or feature of the invention as described herein, where appropriate.

Further features and advantages of the aspects of the present invention will become apparent from the claims and the following description.

BRIEF DESCRIPTION OF THE SEVERAL VIEWS OF THE DRAWINGS

Embodiments of the present invention will now be described by way of example only, with reference to the following diagrams, in which:—

DETAILED DESCRIPTION OF THE INVENTION

A three prong power adapter according to one embodiment of the present invention is shown generally at 15 in FIGS. 3 to 9. The power adapter 15 comprises a plug head part 10 and an adapter part 11. The plug head part 10 has three prongs 12, 13, 14 for connection with a cooperable socket (not shown) so that electrical connection between the prongs 12, 13, 14 and the cooperable socket enables power transfer to the electronics within the adapter part 11.

Figure 2:
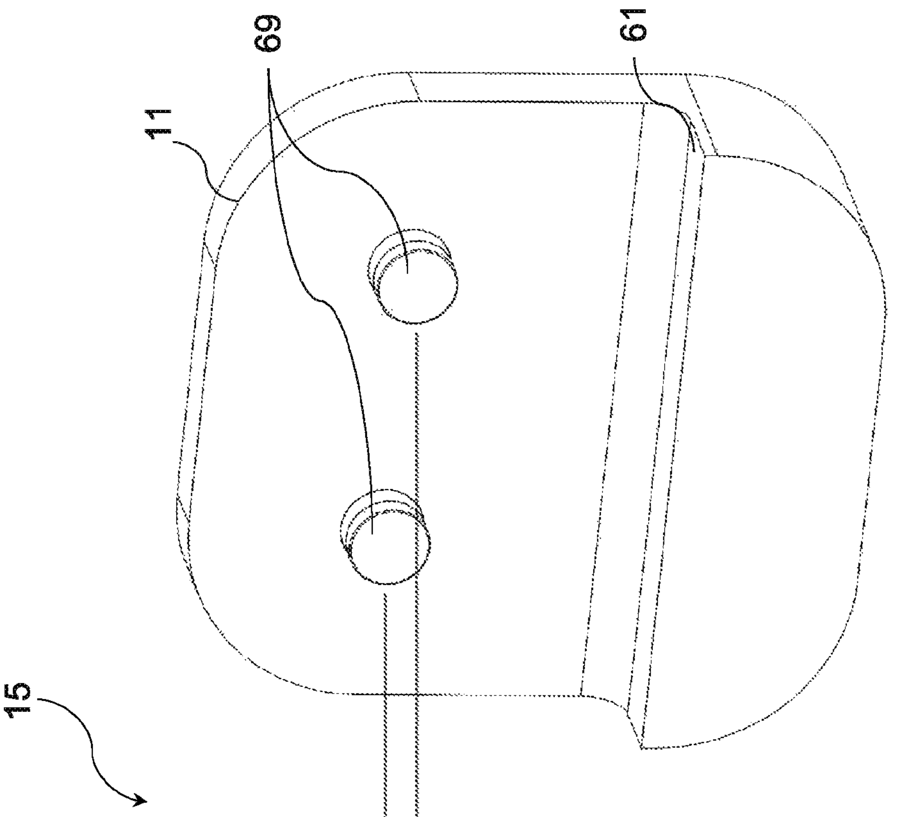
FIG. 2 is a front perspective view of an adapter part of the power adapter used in conjunction with the plug head part of FIG. 1.
Figure 1:
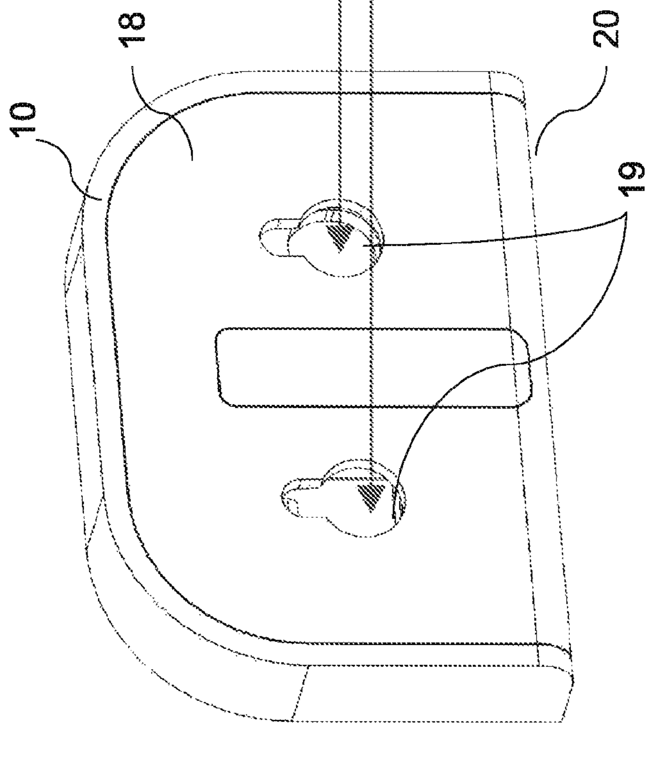
FIG. 1 is a rear perspective view of a plug head part of a power adapter according to one embodiment of the invention.

The plug head part 10 has an outer plug head housing with a rear cover 18 as shown in FIG. 1. FIG. 2 shows a front view of the adapter part 11. Two slots 19 that are circular with an elongate portion, are provided in a central region of the rear cover 18. The slots 19 are arranged to receive and retain two cylindrical keys 69. Cylindrical keys 69 protrude from a front face of the adapter part 11 and are spaced to align with the slots 19 on the rear housing 18 of the adapter part 10. The cylindrical keys 69 are made from a conducting metal to provide the electrical connection between the plug head part 10 and the adapter part 11. The cylindrical keys 69 form part of the actuation mechanism to actuate movement of the power adapter 15 between the stowed and deployed configurations. A front face of the adapter housing 11 is moulded with a planar step 61. The planar step 61 provides an abutment for an end face 20 of the plug head part 10 in the deployed configuration.

Figure 5:
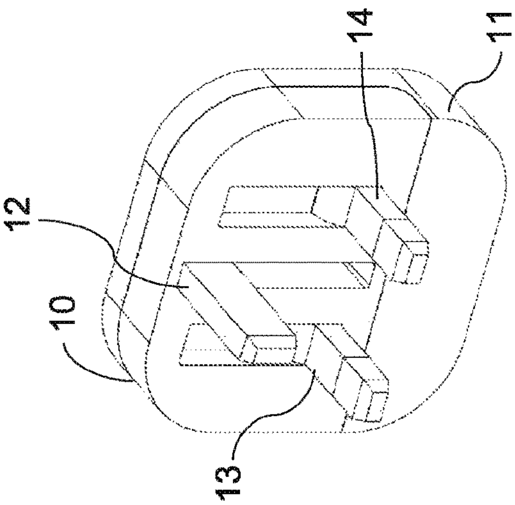
FIG. 5 is a front perspective view of the power adapter of FIG. 3 with the prongs in a deployed position.
Figure 4:
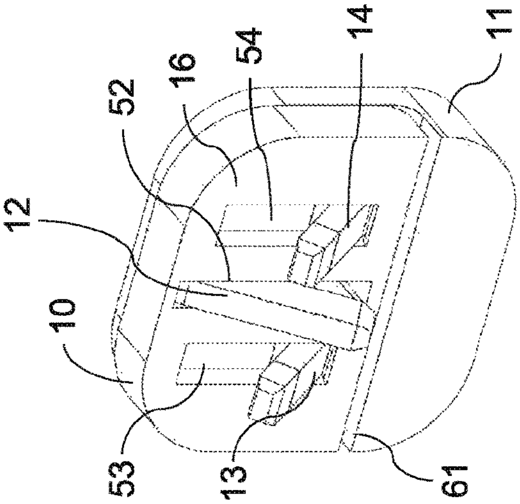
FIG. 4 is a front perspective view of the power adapter of FIG. 3 with the prongs transitioning into a deployed configuration.
Figure 3:
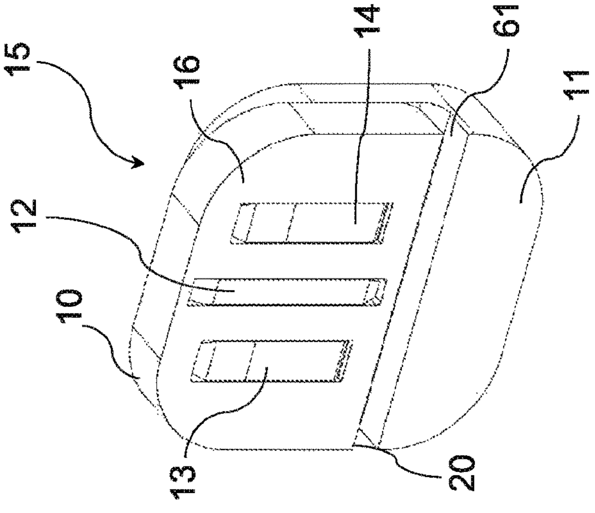
FIG. 3 is a front perspective view of a power adapter with the prongs in a retracted position formed from the plug head part and adapter part of FIGS. 1 and 2.

The power adapter 15 composed from the plug head part 10 and the adapter part 11 slidably coupled via the keys 69 retained within the slots 19 is shown in FIGS. 3 to 5. A front of the plug head housing 16 has a central elongate slot 52 with a parallel elongate slot 53, 54 on each side of the central slot 52. The central elongate slot 52 accommodates an earth prong 12. The earth prong 12 is substantially cuboid and rotatable around one end in a first direction. Deployment of the earth prong 12 occurs by rotation of the earth prong 12 outwith the slot 52 by approximately 90 degrees. The adjacent parallel slots 53, 54, accommodate live and neutral prongs 13, 14 respectively. The live and neutral prongs 13, 14 are substantially cuboid and are rotatable around one respective end of each prong 13, 14 in a second direction. Deployment of the live and neutral prongs 13, 14 occurs by rotation of around 90 degrees outwith the respective slot 53, 54.

Figure 7:
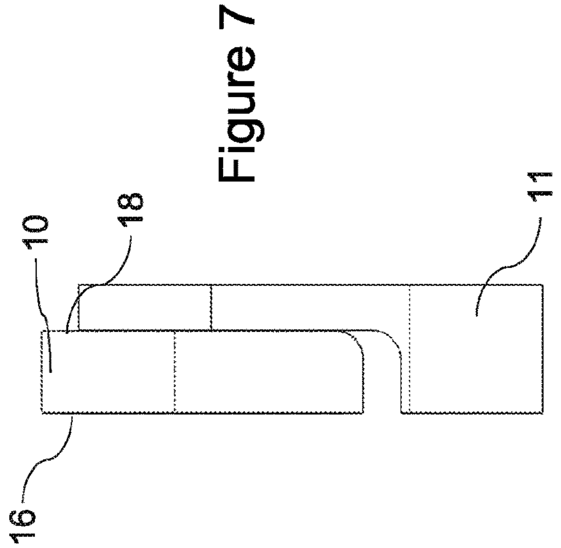
FIGS. 6 and 7 are front and side views respectively of the power adapter of FIG. 3.
Figure 9:
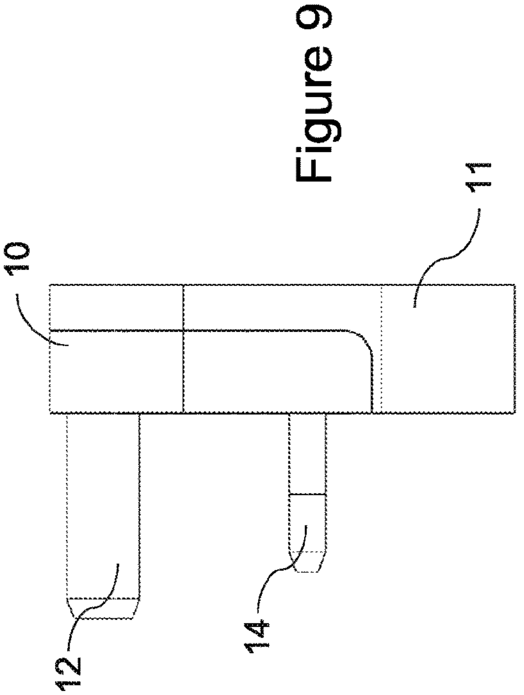
FIGS. 8 and 9 are front and side views respectively of the power adapter of FIG. 5.
Figure 6:
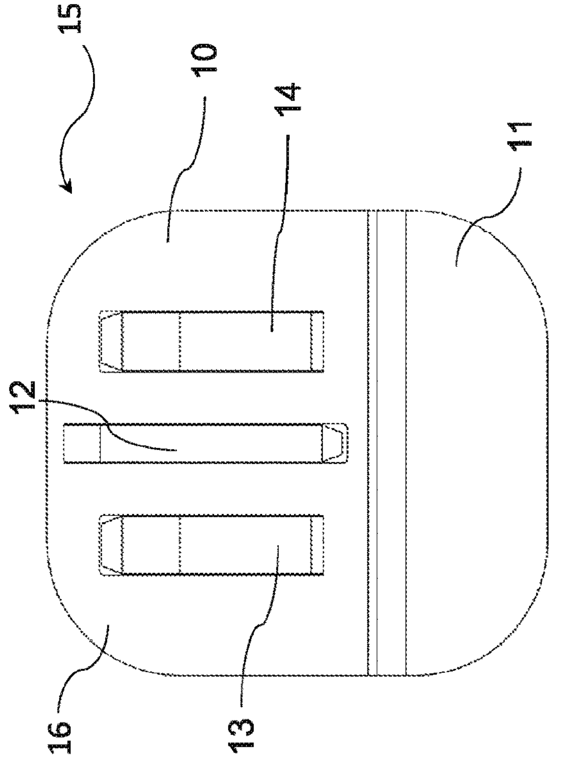
Figure 8:
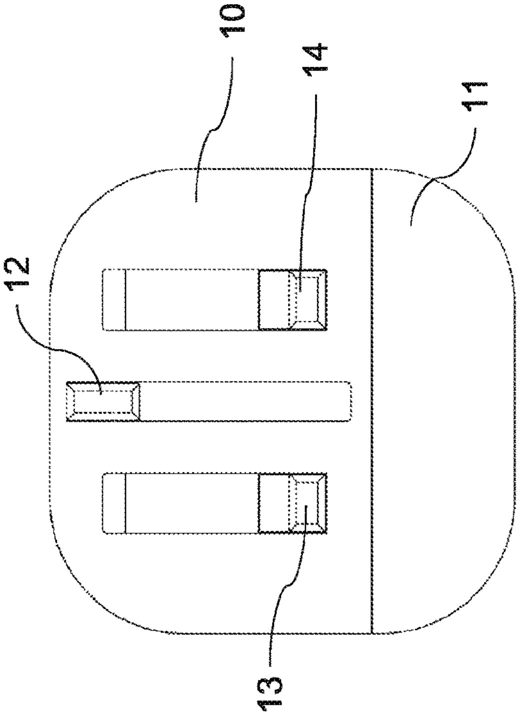

FIGS. 3, 6 and 7 show the prongs 12, 13, 14 of the power adapter 15 in a stowed configuration with the end face 20 of the plug head part 10 spaced from the planar step 61 of the adapter part 11. Pressure applied to the power adapter 15 by a user (not shown) causes the keys 69 to slide within the slots 19 and movement of the end face 20 of the plug head part 10 towards the planar step 61 of the adapter part 11. This relative movement of the plug head part 10 and the adapter part 11 causes actuation of an internal deployment mechanism 30 (described hereinbelow with reference to FIGS. 10 to 17). The movement causes the prongs 12, 13, 14 to rotate and transition between the stowed configuration and the deployed configuration as shown in FIG. 4. Relative movement of the plug head part 10 and the adapter part 11 ceases when the end face 20 of the plug head part 10 abuts the planar step 61 of the adapter part 11. At this point the keys 69 have travelled to the end of the slots 19 and the prongs 12, 13, 14 are in the fully deployed configuration as shown in FIGS. 5, 8 and 9.

Figure 10:
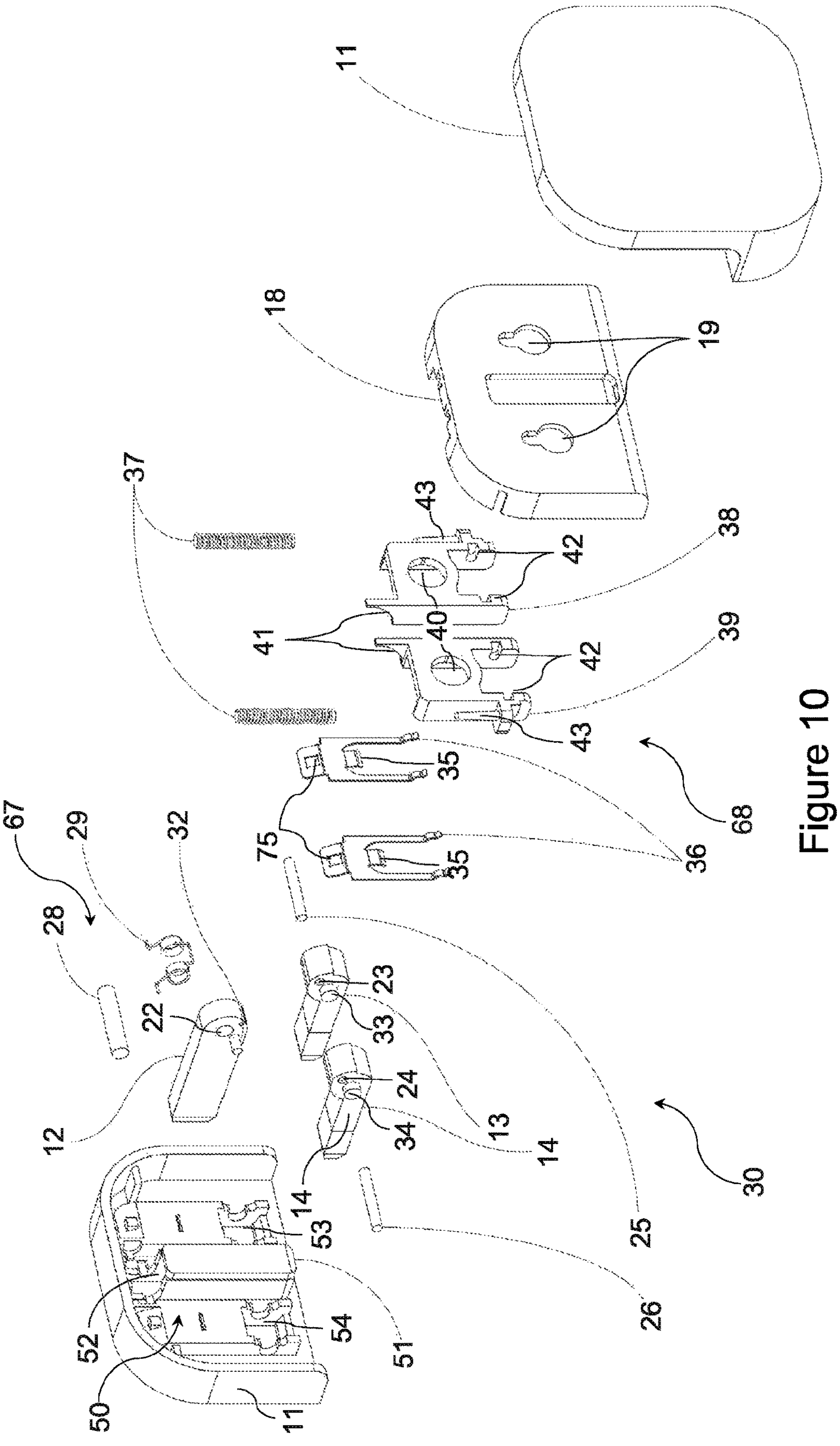
FIG. 10 is an exploded perspective rear view of the power adapter of FIG. 5.
Figure 11:
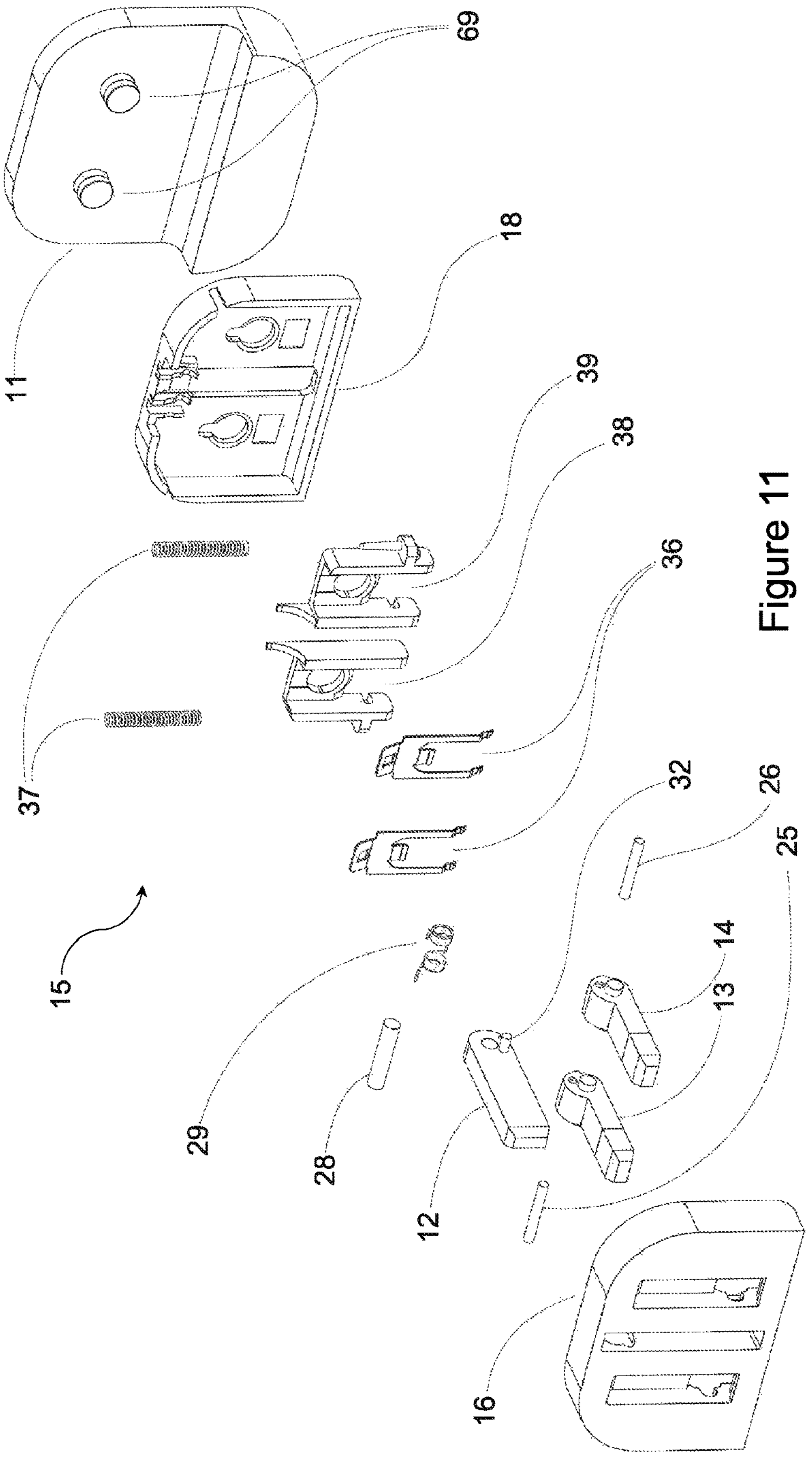
FIG. 11 is an exploded perspective front view of the power adapter of FIG. 5.

The components within the internal deployment mechanism 30 are shown in an exploded view in FIGS. 10 and 11. An interior of the plug head housing 16 has a shaped profile 50. The shaped profile 50 includes a moulded slot housing 51 that forms the slot 52 in the front of the plug head housing 16. The shaped profile 50 additionally includes a plurality of indents and protrusions for receiving and/or retaining components of the deployment mechanism 30. The internal deployment mechanism 30 includes a first portion 67 and a second portion 68.

The first portion 67 of the deployment mechanism 30 is associated with the earth prong 12. Towards one end, the earth prong 12 has a transverse hole 22 for accommodating a pivot pin 28. A cam interaction means in the form of a protrusion 32 is moulded into each side of the earth prong 12 adjacent and longitudinally offset from the transverse hole 22. Each protrusion 32 is cylindrical and extends outwardly from the respective side face of the prong 12 on which it is located. A biasing means in the form of a torsion spring 29 is coupled to each end of the pivot pin 28. The earth prong 12 is located and retained within the shaped profile 50 of the plug head housing 16 by means of the pivot pin 28 and the torsion spring 29. In the stowed configuration, the earth pin 12 is accommodated in the slot 52 such that the protrusion 32 lies adjacent part of the second portion 68 of the internal deployment mechanism 30.

The live and neutral prongs 13, 14 are each substantially cuboid with one cylindrical end. The cylindrical ends of the live and neutral prongs 13, 14 have a protrusion 33, 34, projecting centrally from each side face. The protrusions 33, 34 act as a pivot point around which the prongs 13, 14 are rotatable. A transverse hole 23, 24 is provided through the cylindrical end of each prong 13, 14 and the holes 23, 24 are radially offset from the protrusions 33, 34. The transverse holes 23, 24 accept a respective cam coupling means in the form of a pin 25, 26.

The second portion 68 of the deployment mechanism 30 is associated with the live and neutral prongs 13, 14 and includes the cam coupling means or pins 25, 26 and two sliding cams 38, 39. The sliding cams 38, 39 are mirror image components. Each sliding cam 38, 39 has a central hole 40 for receiving the keys 69 of the actuation mechanism. A first end of each sliding cam 38, 39 has two opposing recesses or pin receiving indents 42 for accepting ends of the pins 25, 26. Outer edges of the sliding cams 38, 39 each have cylindrical spring retainers 43 for retaining a cam spring 37. A second end of each sliding cam 38, 39 has a curved cam surface 41. When the components of the internal deployment mechanism 30 are assembled, the curved cam surface 41 of the first portion 67 of the deployment mechanism 30 is adjacent the cam interaction means or protrusion 32 of the second portion 68 of the deployment mechanism 30.

Two metal conducting plates 36 are located between the shaped internal profile 50 of the plug head housing 16 and the sliding cams 38, 39. The metal conducting plates 36 are provided with metal tabs 35 biased towards the shaped profile 50 within the plug head housing 16 to provide the necessary electrical connection between the adapter part 11 and the prongs 13, 14. One end of the electrical conducting plates 36 has assembly holes 75 for accepting a protrusion formed in the shaped internal profile 50 of the plug head housing 16 to retain the conducting plates 36 in position in use.

Figure 14:
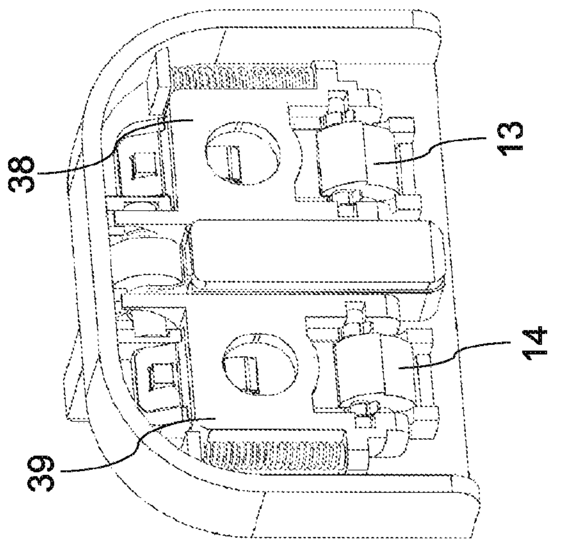
FIG. 14 is a rear perspective view of the plug head part of FIG. 13 showing the prongs in the deployed configuration.
Figure 13:
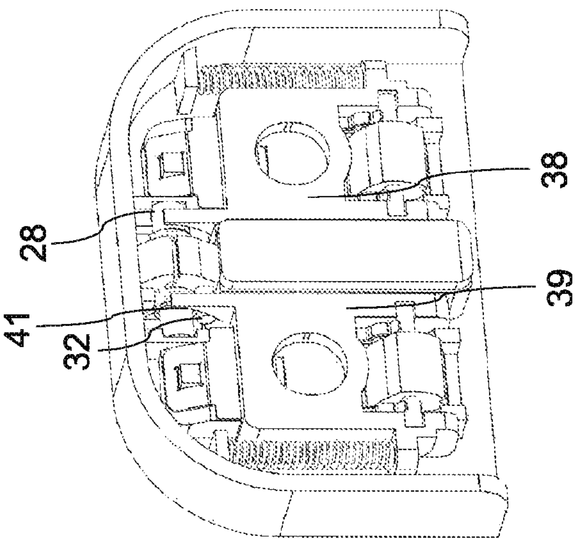
FIG. 13 is a rear perspective view of the plug head part of FIG. 13 showing the prongs transitioning into a deployed configuration.
Figure 12:
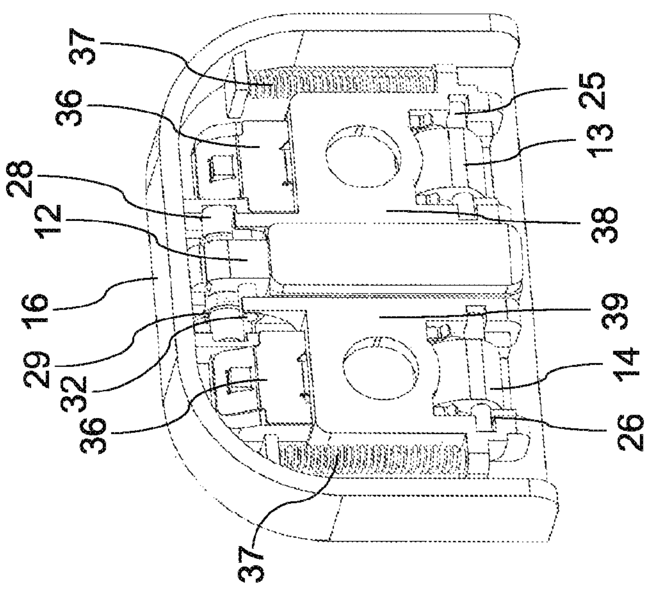
FIG. 12 is a rear perspective view of the plug head part of FIG. 1 with a portion of the housing removed.
Figure 17:
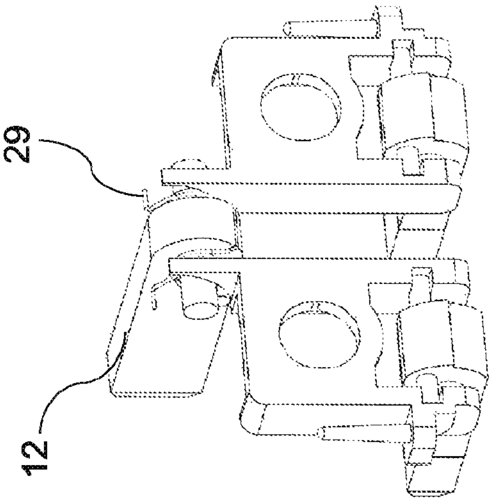
FIG. 17 is a rear perspective view of the internal mechanism of FIG. 15 showing the prongs in a deployed configuration.
Figure 16:
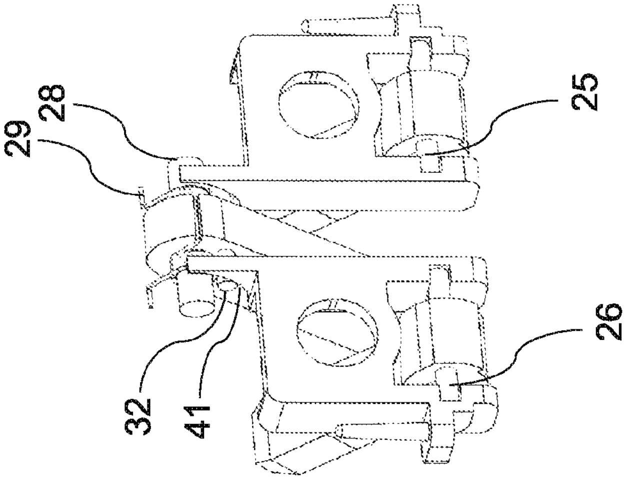
FIG. 16 is a rear perspective view of the internal mechanism of FIG. 15 showing the prongs transitioning to the deployed configuration.
Figure 15:
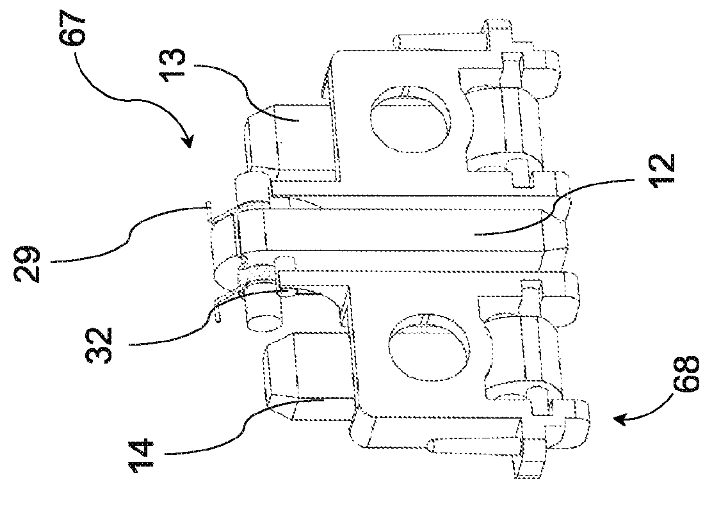
FIG. 15 is a rear perspective view of part of the internal mechanism of the plug head of FIG. 12.

FIGS. 12 to 14 show the two portions 67, 68 of the internal deployment mechanism 30 with the rear cover 18 of the plug head housing 16 removed from the plug head part 10. FIGS. 15 to 17 show only the first and second portions 67, 68 of the internal deployment mechanism 30 and the prongs 12, 13, 14, to illustrate the sequence of movement between the stowed and deployed configurations with all other components removed.

As shown in FIGS. 12 and 15, the prongs 12, 13, 14 are accommodated within their respective slots 52, 53, 54 in the stowed configuration. The stowed configuration reduces the overall dimensions of the power adapter 15 and is therefore particularly suitable for shipping, packing, transporting and storing of the power adapter 15.

In order to use the power adapter 15 in a socket (not shown), a user must deploy the prongs 12, 13, 14. The user applies a force to cause relative movement of the plug head part 10 and the adapter part 11 as hereinbefore described. The cylindrical keys 69 engaged with the second portion 68 of the internal deployment mechanism 30 retain the sliding cams 38, 39 in position while the housing moves downward relative to the cams 38, 39. This relative movement of the sliding cams 38, 39 and the plug head housing 16 causes rotation of the live and neutral prongs 13, 14 since the pins 25, 26 are retained in the pin receiving indents 42 of the sliding cams 38, 39. Thus, the pin receiving indents 42 and inserted pins 25, 26 move upwardly with the sliding cams 38, 39, resulting in rotation of the prongs 13, 14 that are constrained by, but rotatable within, the plug head housing 16 by means of the protrusions 33, 34. At an opposing end of each sliding cam 38, 39, the curved cam surface 41 simultaneously acts against the protrusion 32 on the earth prong 12. The relative upward movement of the curved cam surface 41 causes downward movement of the protrusion 32 attached to the prong 12, which is constrained by and rotatable within the plug head housing 16 by means of the pivot pin 28. As a result, the earth prong 12 rotates around the pivot pin 28 to move the earth prong 12 towards the deployed configuration as shown in the transitional phase in FIGS. 13 and 16.

Downward movement of the plug head housing 16 continues until the end face 20 of the plug head part 10 abuts the planar step 61 of the adapter part 11 so that relative upward movement of the sliding cams 38, 39 continues until all prongs have rotated approximately 90 degrees and are in the fully deployed configuration as shown in FIGS. 14 and 17. In the fully deployed configuration the prongs 12, 13, 14 of the adapter plug 15 are ready for insertion into a socket.

When the user intends to transport or store the power adapter 15, the adapter 15 is removed from the socket and collapsed into the stowed configuration. This is achieved by pulling the plug head part 10 away from the adapter part 11. Such a force applied by the user to the parts 10, 11 in opposing directions, causes the cylindrical keys 69 to slide downwardly within the slots 19. The cam springs 37 urge the sliding cams 38, 39 downwardly within the plug head housing 16. The pins 25, 26 attached to the prongs 13, 14, thus also move downwardly, thereby rotating the live and neutral prongs 13, 14 into the stowed configuration. Downward movement of the sliding cams 38, 39, removes the cam surface 41 acting against the protrusions 32. The torsion spring 29 becomes the controlling force acting on the earth prong 12 and the spring 29 force urges rotation of the earth prong 12 by around 90 degrees or until it is accommodated in the stowed configuration in the slot 52.

Thus the deployment mechanism 30 involves two structurally separate portions 67, 68 of the deployment mechanism 30 acting together to achieve simultaneous deployment of the prongs 12, 13, 14. Actuation results in the transition between the stowed and deployed configurations, which is achieved by movement of the sliding cams 38, 39 of the second portion 68 acting against separate components i.e. the protrusions 32 of the first portion 69 of the deployment mechanism 30. Thus, simultaneous deployment of the prongs 12, 13, 14, is achieved without direct mechanical interconnection or linkage of the earth prong 12 with the live and neutral prongs 13, 14. The transition from the deployed to the stowed configuration for the live and neutral prongs 13, 14 is achieved by relative movement of the sliding cams 38, 39 and the housing 16. Transition from the deployed to the stowed configurations for the earth pin 12 is achieved by spring 37 return. The first and second portions 67, 68 of the deployment mechanism 30 are structurally separate and transition from the deployed to the stowed configurations is achieved without any direct mechanical linkage or coupling of the two portions 67, 68.

All three prongs 12, 13, 14 are mechanically separate. There is no linkage mechanism to directly transfer movement of one prong to another.

The two portions 67, 68 of the deployment mechanism 30 are structurally separate. The lack of direct mechanical linkage or interconnection between the two portions 67, 68 of the deployment mechanism 30 has several advantages. No direct mechanical linkage means that there is minimal stress transfer between components of the deployment mechanism 30. The plug head part 10 is robust since there are no small delicate components required to provide a miniature direct link to translate movement between the live and neutral prongs 13, 14, and the earth prong 12. The structural separation of the portions 67, 68 of the deployment mechanism 30 has the additional benefit that the overall number of parts is reduced, resulting in lower tooling, material and overall cost, more efficient and environmentally conscious use of resources, and smaller overall dimensions. The maximum thickness of the plug head part 10 is 9 mm.

According to the present embodiment, the power adapter 15 is type G and compatible with British Standards covering this area of technology e.g. BS1363.

According to an alternative embodiment, the second portion of the deployment mechanism can include a single sliding cam that is linked to both the live and neutral prongs 13, 14.

According to alternative embodiments, the power adapter 15 is customisable depending on the particular application. For example, the metal plate conductors 36 can be replaced with plastic dummies should an alternative means of electrical connection be required.

A number of different embodiments of the invention are described subsequently. In order to minimise repetition, similar features of the different embodiments are numbered with a common two-digit reference numeral and are differentiated by one or more digits placed before the two common digits. Such features are structured similarly, operate similarly, and/or have similar functions unless otherwise indicated.

Figure 18:
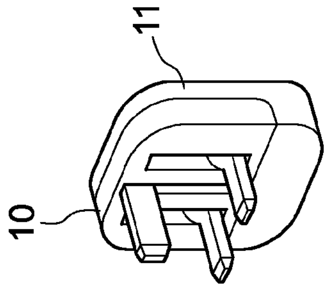
FIG. 18 is a front perspective view of a 5 Watt power adapter.
Figure 19:
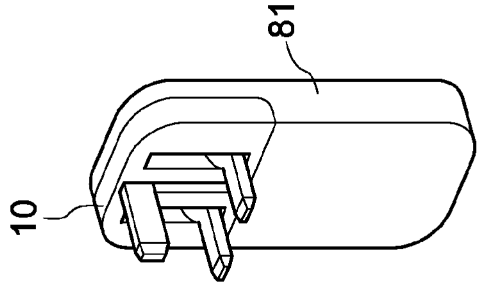
FIG. 19 is a front perspective view of a 10-45 Watt power adapter.
Figure 20:
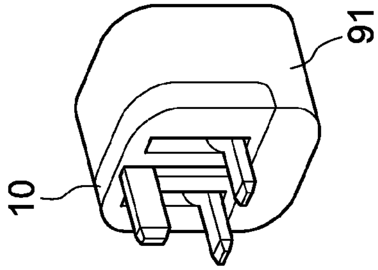
FIG. 20 is a front perspective view of a 15-45 Watt power adapter.
Figure 21:
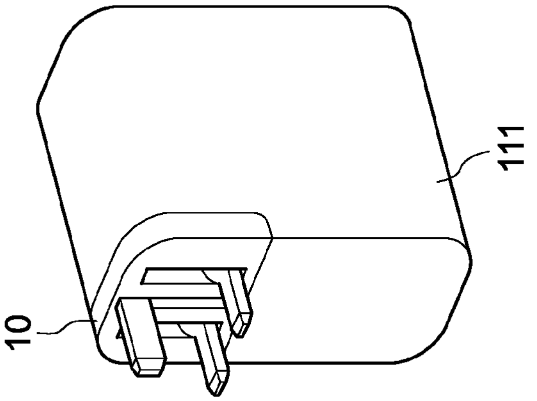
FIG. 21 is a front perspective view of a 45-180 Watt power adapter.
Figure 22:
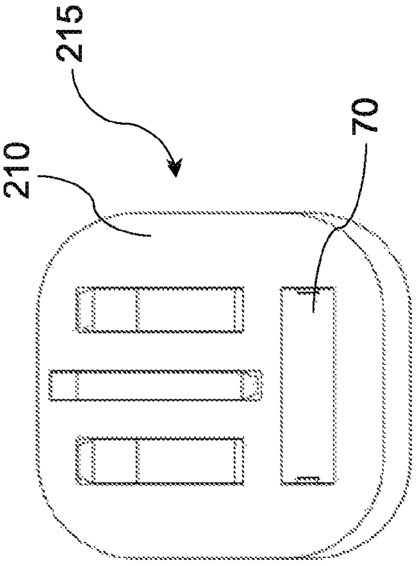
FIG. 22 and FIG. 23 are front and side views respectively of an alternative power adapter with a fuse in a stowed configuration.
Figure 23:
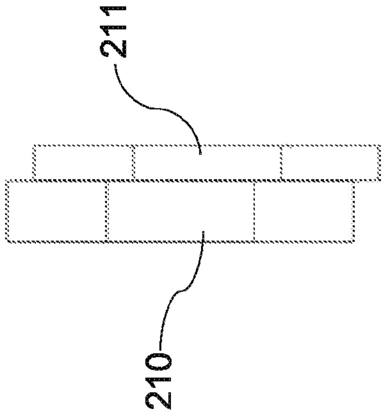
Figure 24:
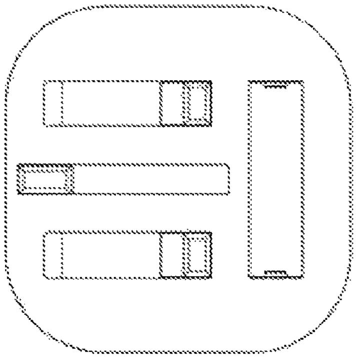
FIG. 24 and FIG. 25 are front and side views respectively of a power adapter with the fuse in a deployed configuration.
Figure 25:
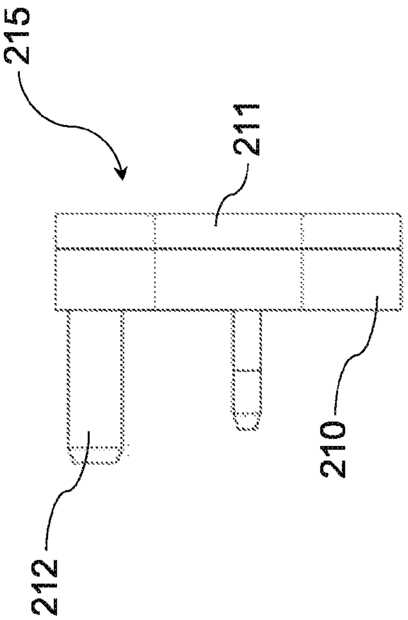

According to another embodiment, power adapters may be a different rating, shape and size. The plug head part 10 is common to all embodiments shown in FIGS. 18 to 21. The power adapter part 11 shown in FIG. 18 is suitable for a device requiring a 5 Watt power connection. Different ratings and sizes of power adapter parts 81, 91, 111 are shown in FIGS. 19, 20 and 21, and are provided to supply different power ranges of 10-45 Watts; 15-45 Watts, and 45-180 Watts respectively. Each of the adapter parts 81, 91, 111 has the conducting cylindrical keys 69 to slidably couple with the slots 19 of the plug head part 10. Therefore, the plug head part 10 with the collapsible prongs 12, 13, 14 is a common component of each size of power adapter and the mechanism of prong 12, 13, 14 movement is the same for each power adapter. Movement of the prongs 12, 13, 14 is achieved by relative movement of the plug head part 10 and the respective power adapter part 11, 81, 91, 111. This is advantageous as it reduces manufacturing costs for power adapters of different ratings and sizes as well as providing a consistent user experience with different power adapters used in conjunction with a range of devices.

According to other embodiments of the invention, different numbers of prongs, alternative arrangements, designs and dimensions of the power adapter may be selected according to compatibility with any country or region specific design, code or standard. Each such embodiment may have core features of the first aspect of the invention including the simultaneous prong deployment and the structurally separate portions of the deployment mechanism. Each such embodiment may have core features of any aspect of the invention including the separation of the adapter into a plug head part and an adapter part movable relative to one another to rotate the prongs between the deployed and the stowed configurations.

FIGS. 22 to 25 show an alternative embodiment wherein a power adapter 215 comprises a plug head part 210 and an adapter part 211. The plug head part 210 is dimensionally similar in length and width to the adapter part 211. Internally, the plug head part contains a deployment mechanism similar to that described in connection with the first embodiment. Beneath the prongs 212, 213, 214 there is space for a fuse 70 to be accommodated within a recess at the front of the plug head part 210. The plug head part 210 and the adapter part 211 may be mechanically interconnected or designed to be separable components. Actuation and deployment of the prongs 212, 213, 214 are as previously described. The altered design of the plug head part 210 enables the fuse 70 to be easily accessed and replaced.

Figures 26, 27, 28, 29, 30, 31:
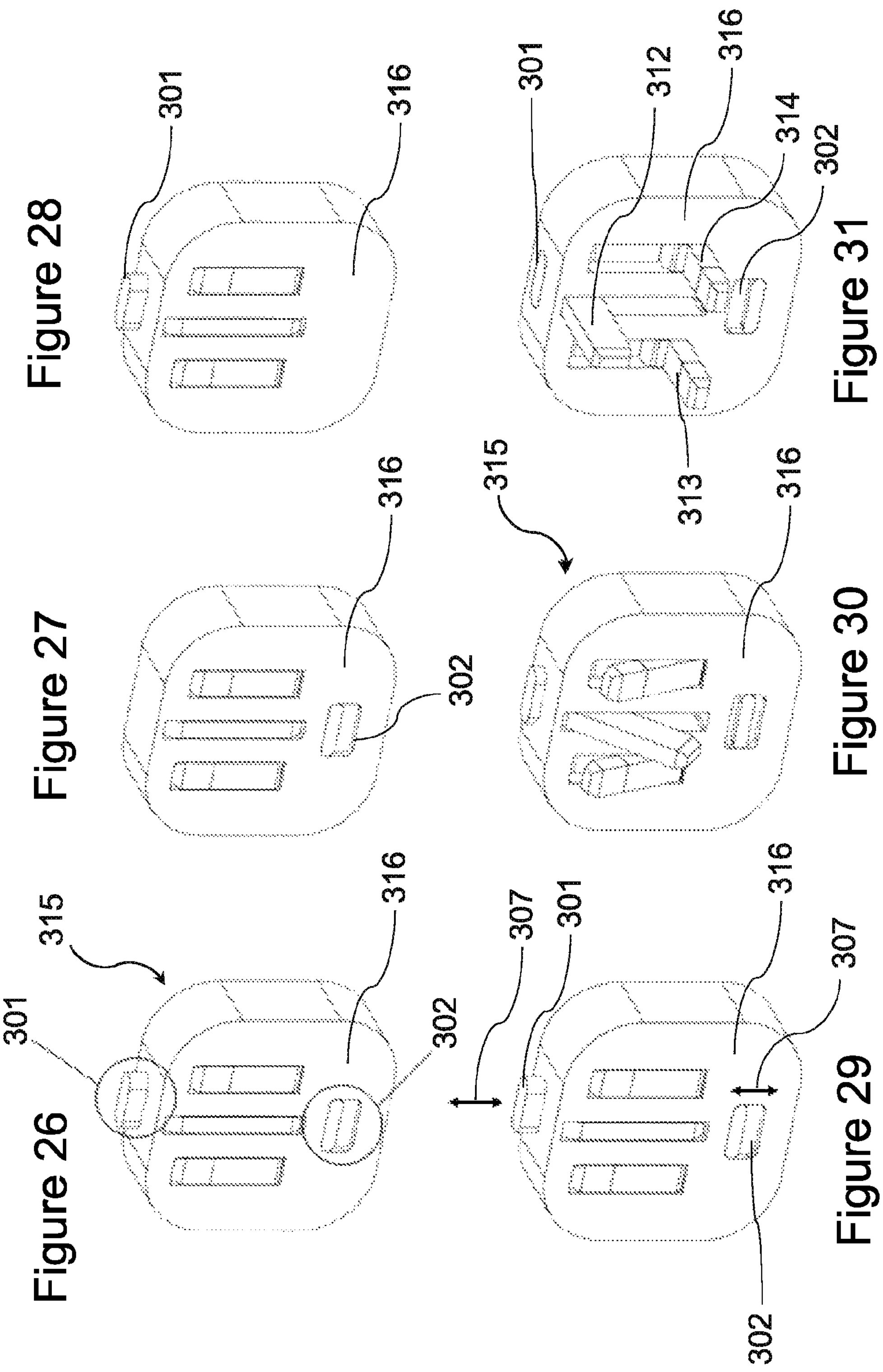
FIG. 26 is a perspective view of an alternative power adapter with a push switch and a slide switch actuation mechanism.
FIG. 27 is a perspective view of an alternative power adapter with a slide switch actuation mechanism.
FIG. 28 is a perspective view of an alternative power adapter with a push switch actuation mechanism.
FIGS. 29 to 31 are perspective views of the power adapter of FIG. 26 in a fully stowed, transitional and fully deployed configuration respectively.
Figure 34:
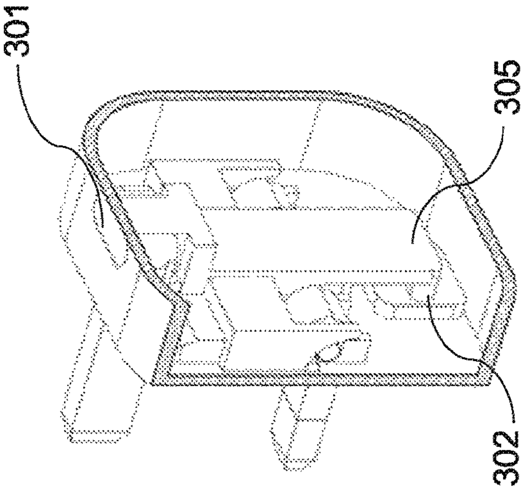
FIGS. 32 to 34 are perspective views of an internal mechanism of the power adapter of FIGS. 29 to 31.
Figure 33:
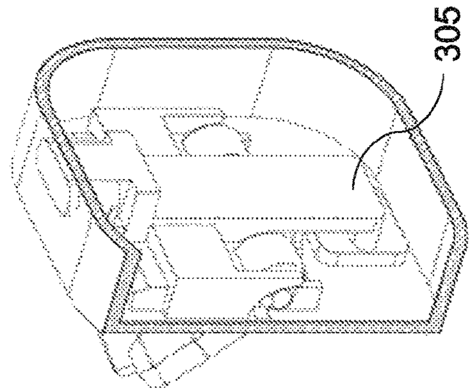
Figure 32:
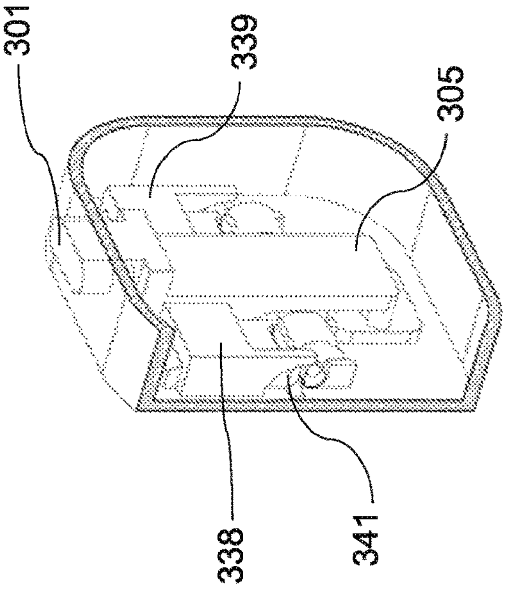
Figure 36:
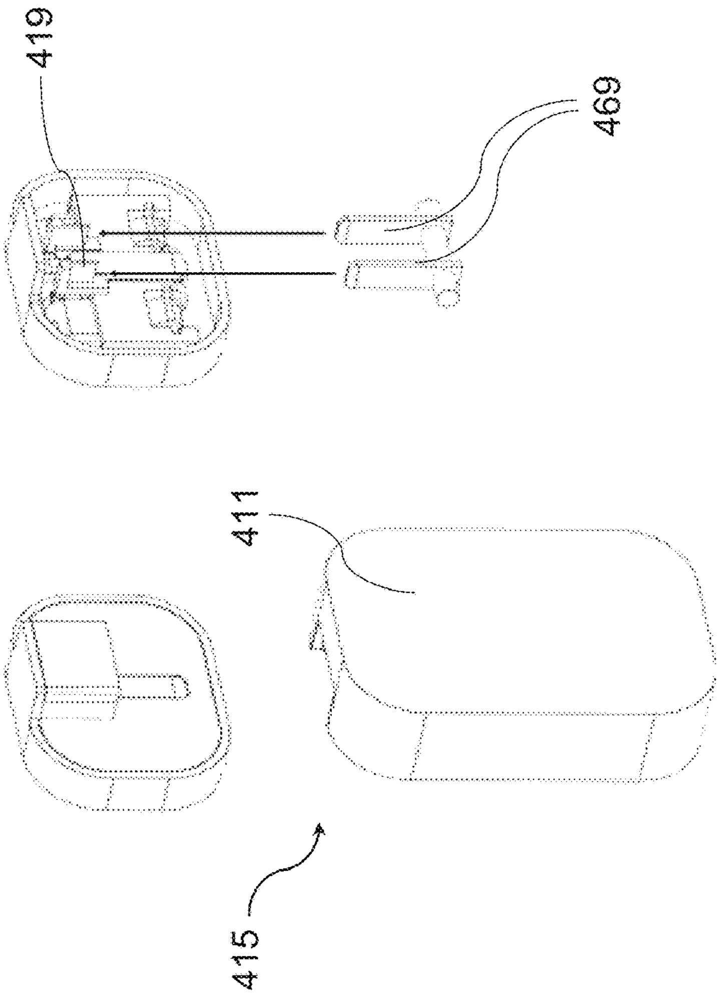
FIGS. 35 to 41 are perspective views of a plug head and adapter part with an alternative interconnection means.
Figure 35:
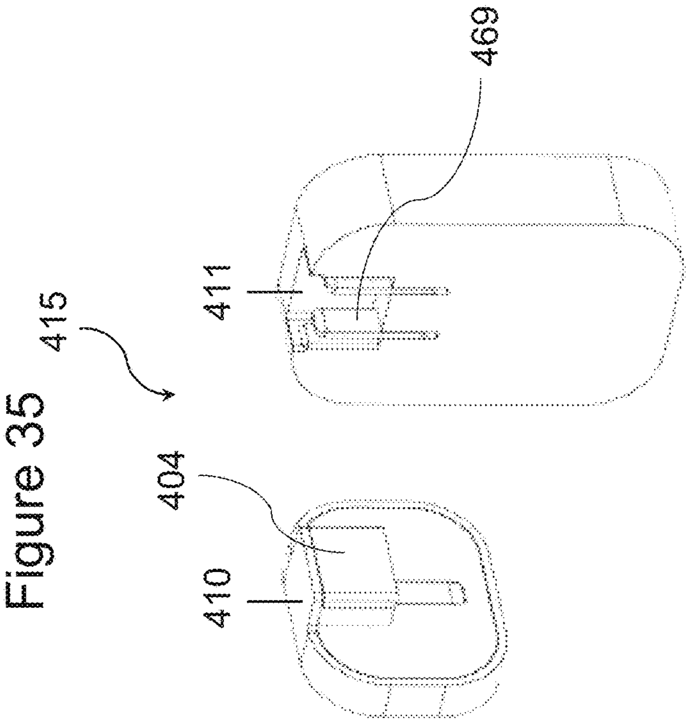

Embodiments of a power adapter 315 with alternative actuation mechanisms and forming a single unit enclosed within a housing 316 are shown in FIGS. 26 to 34. According to all these embodiments, the deployment mechanism is similar to that described with reference to the first embodiment and is located within the housing 316. FIGS. 26 and 29 to 31 show a power adapter 315 with an actuation mechanism in the form of a push switch 301 and a slide switch 302. FIG. 27 shows a power adapter 315 having a slide switch 302 actuation mechanism and the power adapter 315 of FIG. 28 has a push switch 301 actuation mechanism. Instead of the key 69 and slot 19 actuation mechanism of the first embodiment, the push switch 301 and/or slide switch 302 is cooperable with a centrally located bar 305 forming part of the deployment mechanism (FIGS. 32 to 34). The bar 305 is fixed to the cams 338, 339 on either side and thus, the bar 305 and the cams 338, 339 move as a single body. The push switch 301 is coupled to an upper end of the bar 305 and the slide switch 302 is coupled to a lower end of the bar 305. Thus, movement of either or both of the switches 301, 302 causes corresponding movement of the cams 338, 339 relative to the housing 316 to thereby cause substantially simultaneous rotation of the prongs 312, 313, 314.

Figure 37:
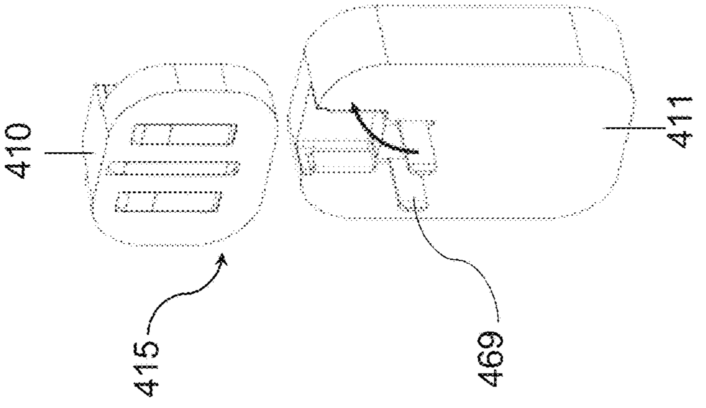
Figure 38:
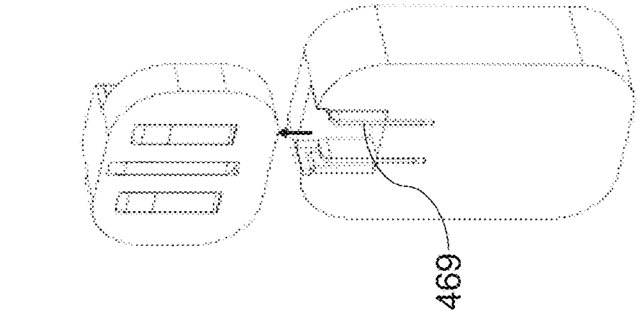
Figure 39:
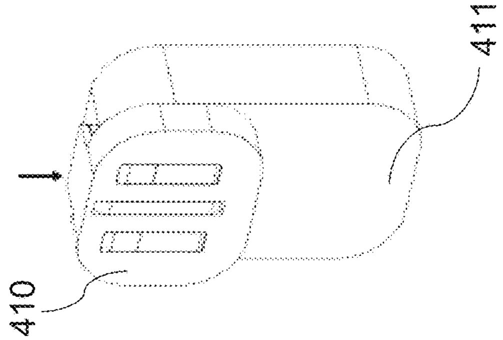
Figure 40:
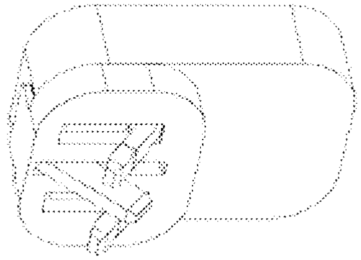
Figure 41:
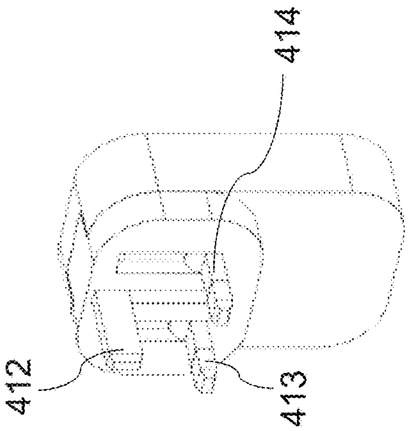
Figure 45:
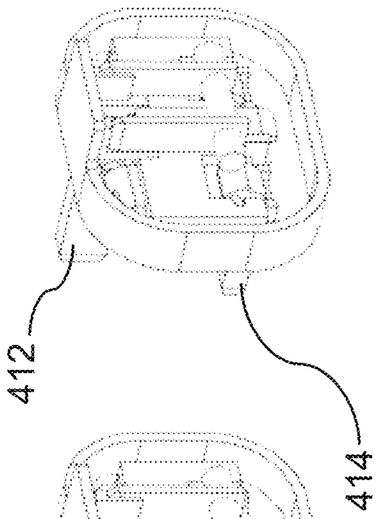
FIGS. 42 to 45 are perspective views of the plug head and adapter part of FIGS. 35 to 41 with a rear cover removed to show the internal deployment mechanism.
Figure 44:
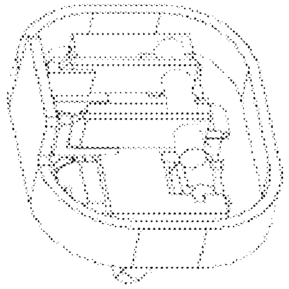
Figure 43:
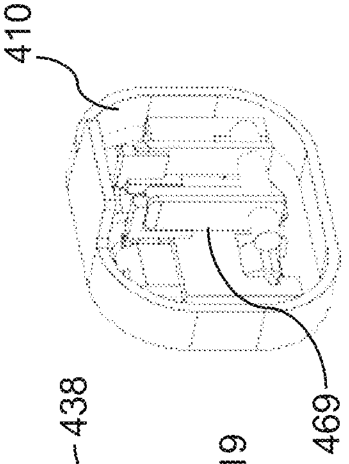
Figure 42:
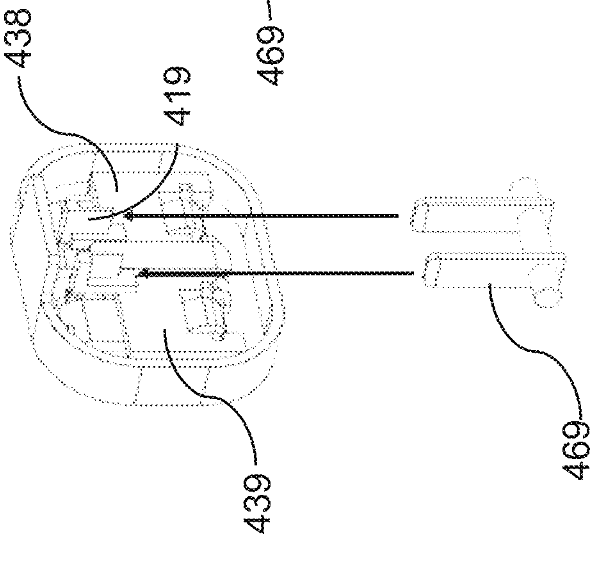

FIGS. 35 to 45 show an embodiment of a power adapter 415 with an alternative output from the plug head part 410, and an adapter part 411 which is a self-contained power adapter with type-A pins such as those used in the US and large parts of Asia. The plug head part 410 has a connector portion 404 that contains receiving slots 419 to accept electrical key connectors 469 in the form of type A pins. The electrical key connectors 469 are metal elongate pins. The adapter part 411 is also a power adapter arranged to mate with type A complementary sockets when the electrical key connectors 469 are pivoted to stand perpendicular relative to a front face of the adapter part 411 as shown in FIG. 37. When the electrical key connectors 469 are pivoted into the stowed configuration (FIG. 38), they are insertable into the receiving slots 419. Both the receiving slots 419 are coupled to a respective cam 438, 439, such that engagement of the key connectors 469 in the slots 419 causes simultaneous movement of the cams 438, 439. The cams 438, 439 and remainder of the internal deployment mechanism are structured similarly to that described with reference to the first embodiment. Pushing the plug head part 410 and the adapter part 411 towards one another connects the two parts 410, 411 and causes deployment of the prongs 412, 413, 414.

Figure 47:
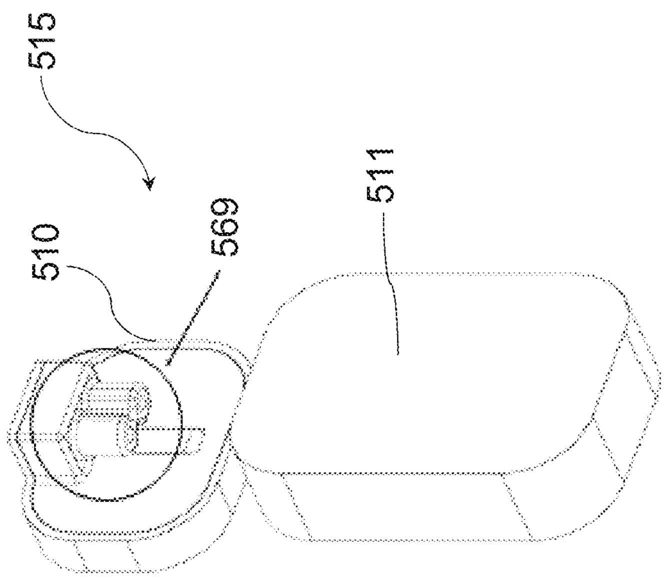
FIGS. 46 and 47 are perspective views of a plug head and adapter part with alternative interconnection means.
Figure 46:
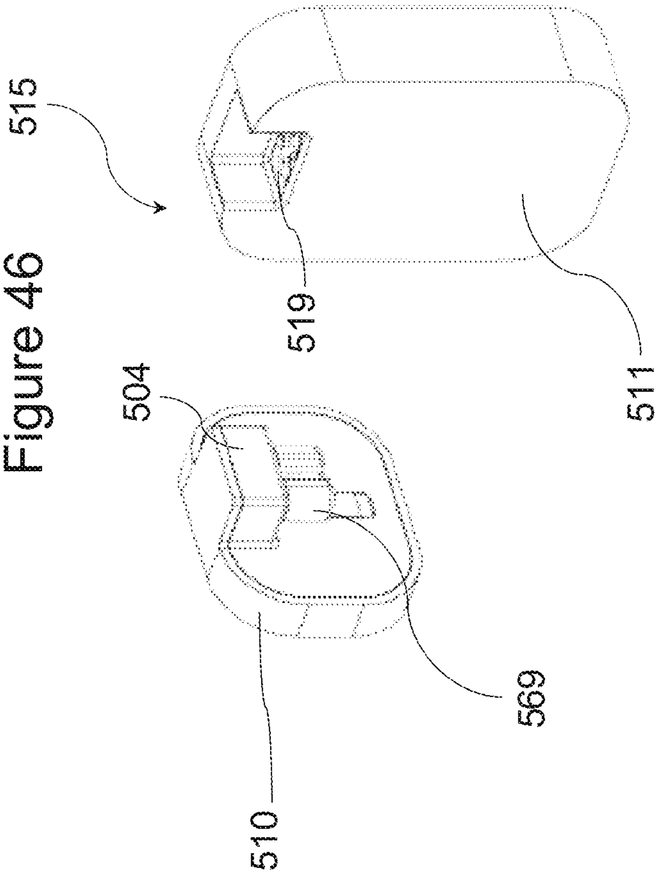

FIGS. 46 and 47 show another embodiment of a power adapter 515 with a plug head part 510 having an alternative interconnection means. An alternative output is located in a connector portion 504 of the plug head part 510 in the form of a C8 connector. The C8 connector has electrical keys 569 that are insertable into complementary receiving slots 519 that are located on the adapter part 511 and act on the internal deployment mechanism in a similar manner to that previously described in association with FIGS. 42 to 45.

According to an alternative embodiment (not shown in the figures), a different actuation mechanism can be incorporated into the adapter 515, such that deployment of the prongs may occur by actuation of a switch that is linked to the internal deployment mechanism and provided on a rear face of the plug head part 510 beneath the connector portion 504 and/or in the region of the electrical keys 569.

Figure 48:
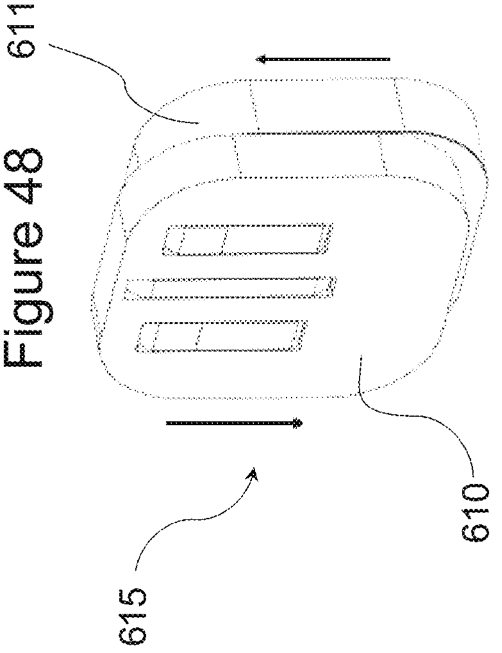
FIGS. 48 to 50 are perspective views of an adapter with a mechanically retained plug head and adapter part.
Figure 49:
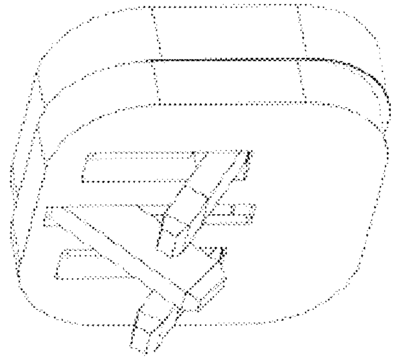
Figure 50:
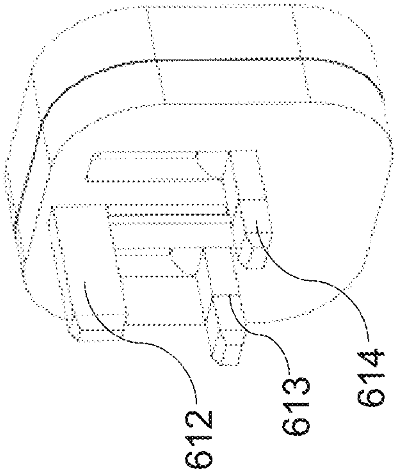
Figure 54:
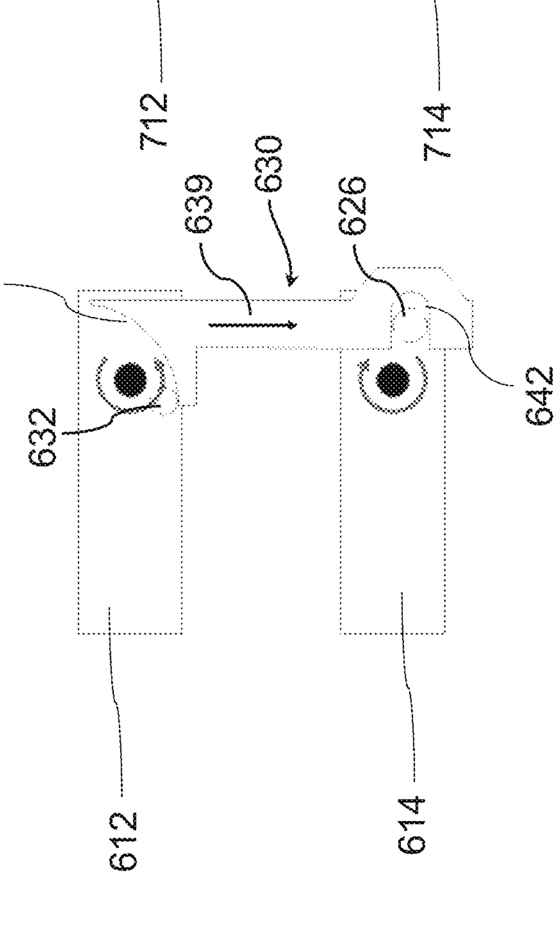
Figure 58:
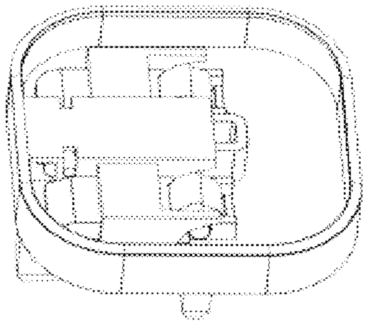
FIGS. 56 to 58 are perspective views of the internal mechanism of the adapter of FIGS. 51 to 53 in a fully stowed, transitional and fully deployed configuration respectively.
Figure 57:
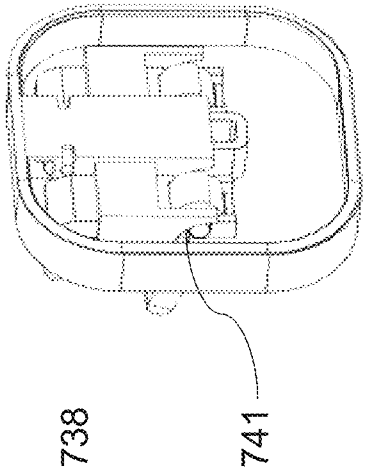
Figure 56:
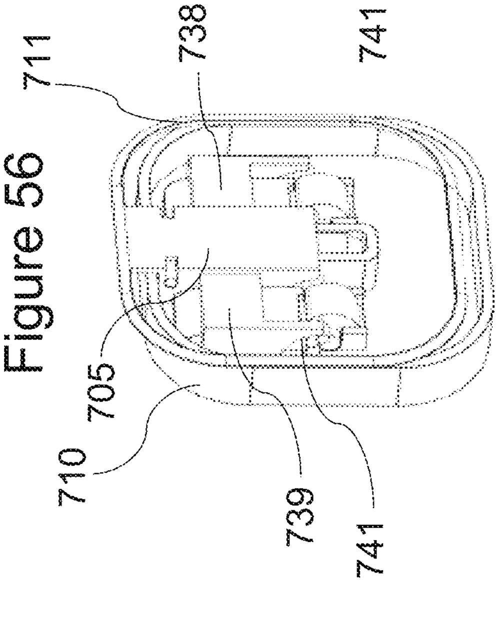
Figure 59:
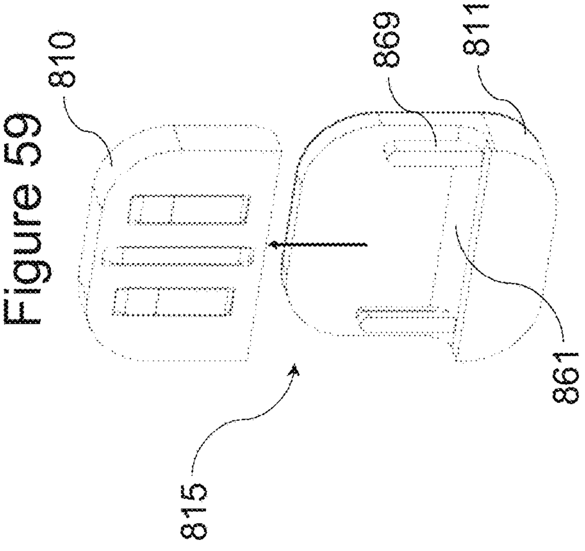
FIGS. 59 to 63 are perspective views showing an adapter with an alternative slot-in mechanism for coupling of the plug part and adapter part.
Figure 60:
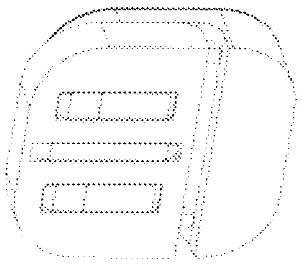
Figure 61:
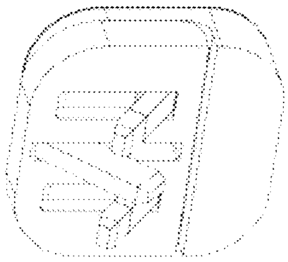
Figure 62:
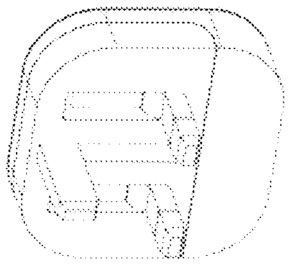
Figure 63:
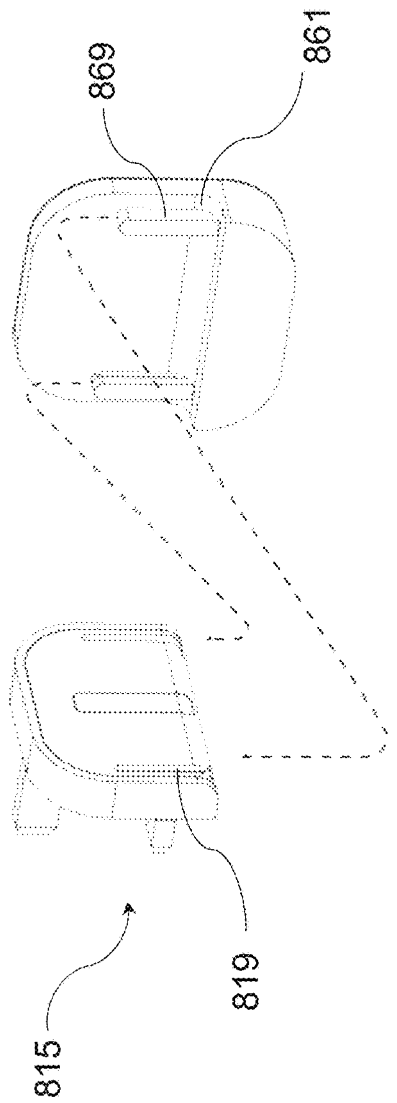

Another embodiment is shown in FIGS. 48 to 50 in which the plug head part 610 and the adapter part 611 of the power adapter 615 are mechanically engaged by interconnection means. The interconnection means may be keys in a keyway or a sliding retaining connection between the adapter part 611 and the plug head part 610. The internal deployment mechanism 630 is shown schematically in FIG. 54 and is the same as previously described with reference to the first embodiment. The interconnection means have a dual function and act as a mechanical interconnection means as well as the actuation mechanism to cause movement of the prongs 612, 613, 614 between the stowed and deployed configurations upon relative movement of the plug head part 610 and the adapter part 611.

Figure 51:
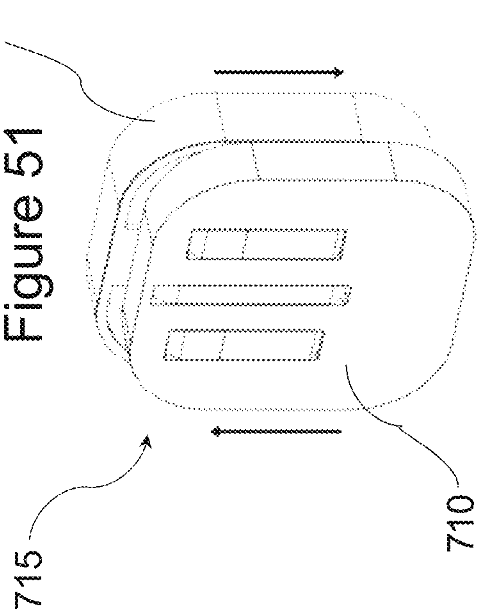
FIGS. 51 to 53 are perspective views of an adapter with a mechanically retained plug head and adapter part that are actuable in a reverse direction.
Figure 52:
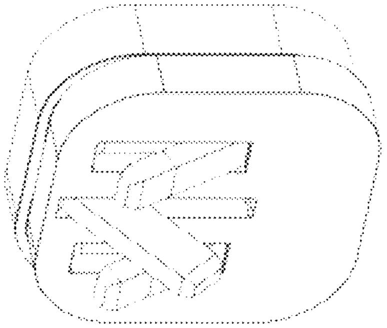
Figure 53:
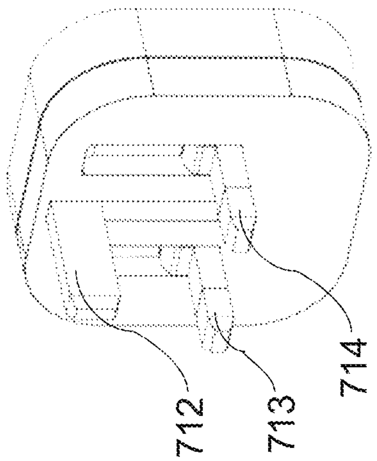
Figure 55:
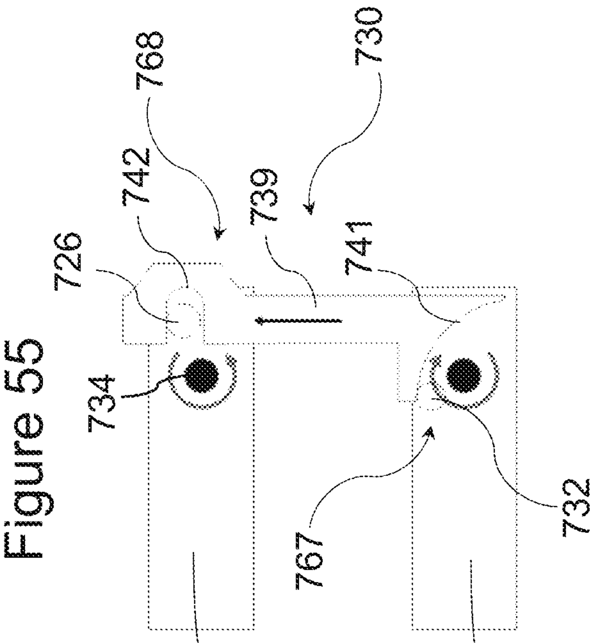
FIGS. 54 and 55 are schematic views of the deployment mechanism for the plug head of FIGS. 48 to 50 and for the plug head of FIGS. 51 to 53, respectively.

FIGS. 51 to 53 also show a power adapter 715 having a mechanically engaged and interconnected (as opposed to releasable) plug head part 710 and adapter part 711. The internal deployment mechanism 730 is arranged in a reverse direction compared with that described in connection with the first embodiment, as shown schematically in FIG. 55. The second portion 767 of the deployment mechanism is associated with the earth prong 712. The earth prong 712 has two cylindrical protrusions 726 extending perpendicular therefrom and offset from the axis of rotation of the earth prong 712 about the pivot pin 734. The sliding cams 738, 739 each have a pin receiving indent 742 for accepting the protrusions 726 on each side of the earth prong 712. Opposing ends of each cam 738, 739 have an arcuate cam surface 741 that lies adjacent the first part 767 of the internal deployment mechanism 730 in the form of radially offset protrusions 732 (only one shown) on the live and neutral prongs 714. Movement of the cams 738, 739 causes simultaneous pivoting and movement of the pins 712, 713, 714 in the inverse direction to that previously described with reference to the first embodiment.

Figure 64:
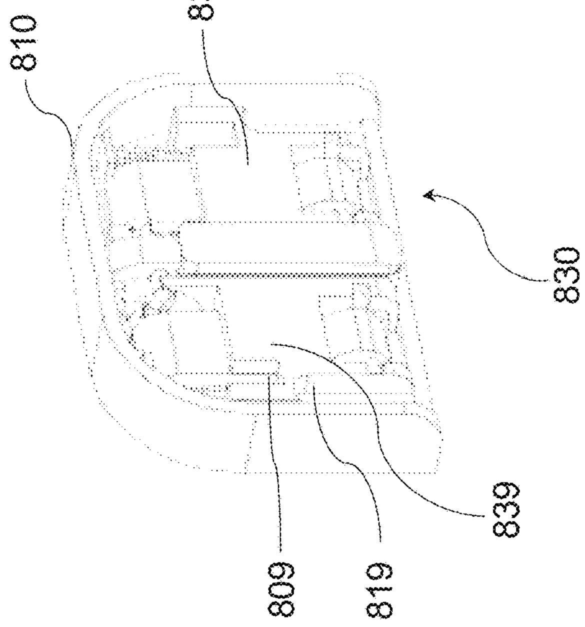
FIGS. 64 to 66 are perspective views of the internal mechanism of the plug head of FIGS. 59 to 63 in a fully stowed, transitional and fully deployed configuration respectively.
Figure 65:
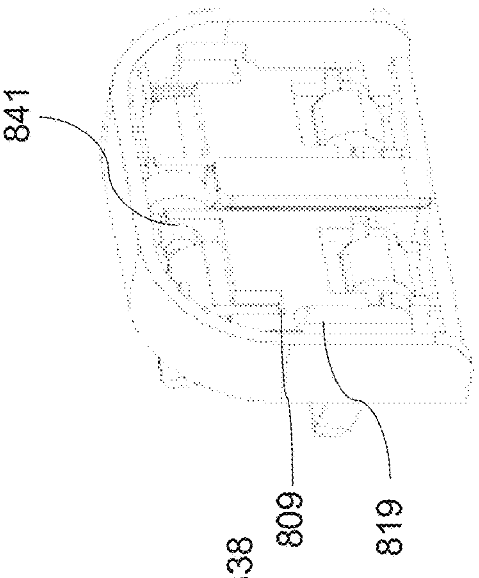
Figure 66:
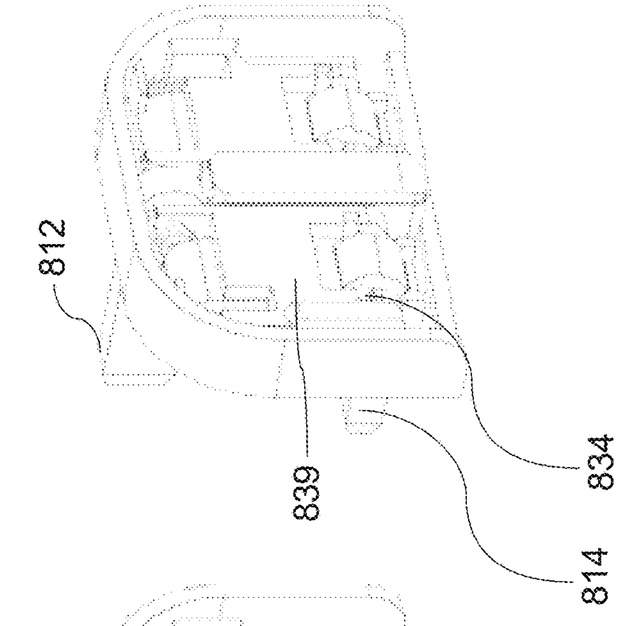

A power adapter 815 with an alternative interconnection means is shown in FIGS. 59 to 66. The power adapter 815 has a plug head part 810 and an adapter part 811 with two parallel elongate locating keys 869 on a front face extending perpendicular to the abutment step 861. The elongate keys 869 are arranged to locate in two parallel slots on a rear face of the plug head part 810. The elongate keys 869 within the parallel slots 819 act as both an interconnection means and an actuation mechanism. The internal deployment mechanism 830 is similar to that described with reference to the first embodiment except that the parallel elongate slots 819 cause elongate keys 869 to act towards a central side edge of the cams 839, 838, such that engagement of the elongate keys 869 within the slots 819 causes resultant movement of the cams 838, 839 and hence rotation of the prongs 812, 813, 814 as shown in FIGS. 64 to 66.

Figures 67, 68, 69, 70, 71, 72:
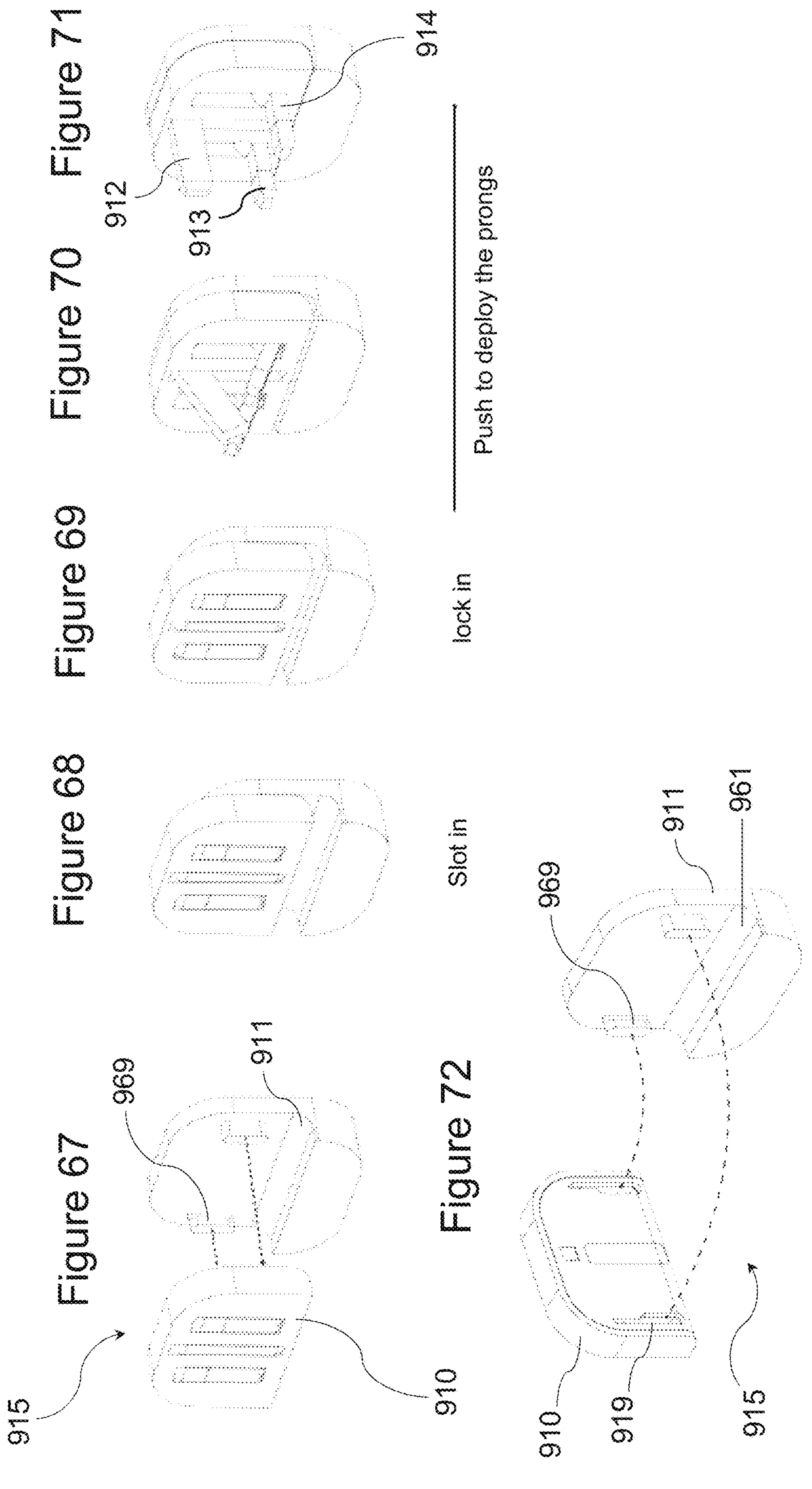
FIGS. 67 to 72 are perspective views of an adapter with a plug head and an adapter part with a slot, lock and push actuation mechanism and interconnection means.
Figure 73:
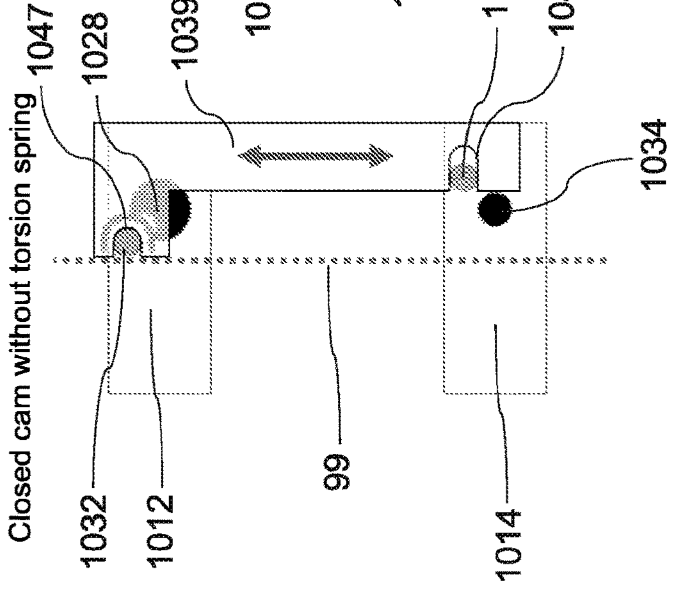
FIGS. 73 to 75 are schematic side views of two prongs and an alternative deployment mechanism comprising a closed cam.
Figure 74:
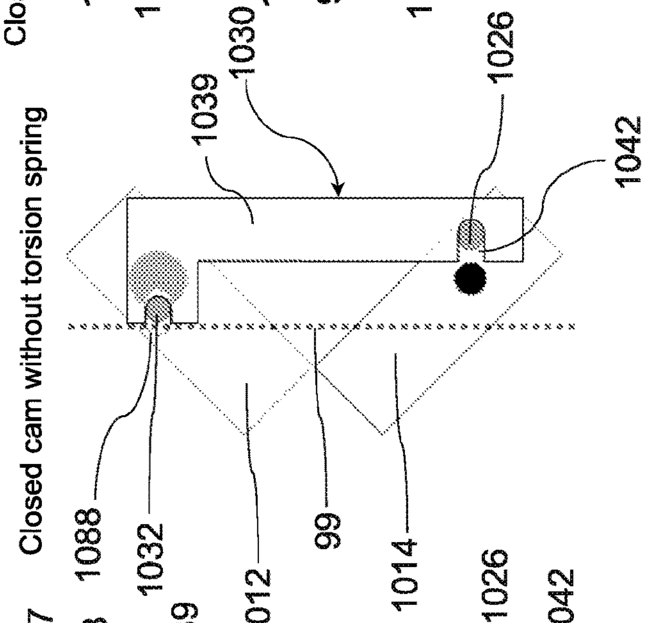
Figure 75:
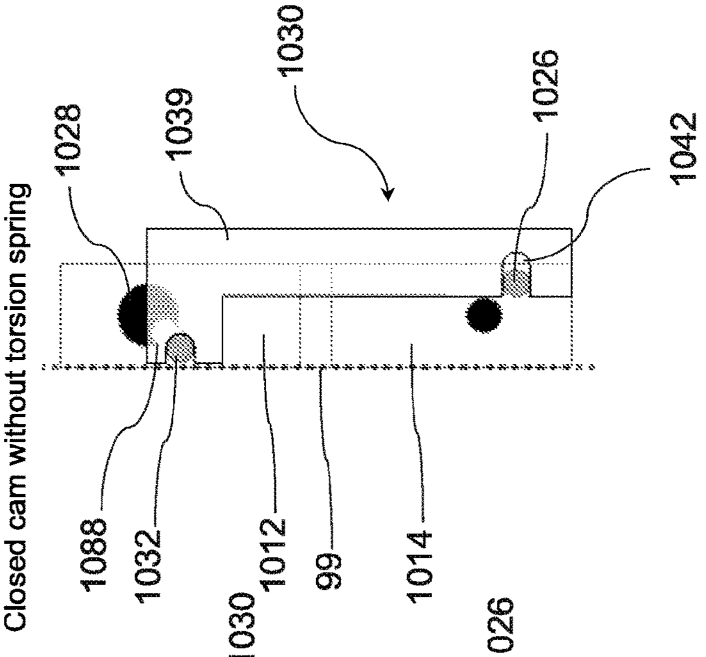

Another embodiment of the invention is shown in FIGS. 67 to 72. A power adapter 915 is provided with alternative interconnection means in the form of two keys 969 protruding from a front face of the adapter part 911 and two parallel slots 919 in a rear face of the plug head part 910, wherein the slots are enlarged towards a lower end and taper towards an upper end. This enables easy interconnection between the two keys 969 and the enlarged lower part of the slots 919 to allow the adapter part 911 to 'slot into' the plug head part 910 as shown in FIG. 68. Further force applied in opposing directions to the plug head part 910 and the adapter part 911 urges the two keys 969 into the tapered part of the slots 919 to effectively 'lock' the plug head part 910 and the adapter part 911 as shown in FIG. 69. Further force applied until the lower end of the plug head part 910 abuts the planar step 961 causes deployment of the prongs 912, 913, 914 via a similar internal deployment mechanism to that described in connection with the previous embodiment as shown in FIG. 71.

According to FIGS. 73 to 75 and 81 to 89, an alternative internal deployment mechanism 1030 is shown. The earth prong 1012 and live prong 1014 pivot in opposing directions around a central pivot pin 1028 and 1034 respectively. According to the present embodiment, the earth pin 1012 has an elongate slot 1088 extending radially relative to the pivot axis of the pivot pin 1028. A cam pin 1032 is inserted and extends through the elongate slot 1088 of the earth prong 1012 so that the cam pin 1032 is slideable within the slot 1088 and can shift radial position relative to the pivot axis of the pivot pin 1028. The cam pin 1032 forms part of the deployment mechanism 1030 and is retained within recesses 1047 of the sliding cams 1038, 1039. The recesses 1047 accommodating the cam pin 1032 effectively close the cams 1038, 1039 around the cam pin 1032 extending through the earth prong 1012. Therefore, there is no requirement for a torsion spring to return the earth prong 1012 to the stowed configuration because the cam pin 1032 is constrained by the partially closed recesses 1047 to follow movement of the cams 1038, 1039.

The lower live and neutral prongs 1013, 1014 each have two cylindrical protrusions 1026 (one shown) extending from each side of the prongs 1013, 1014 that form part of the internal deployment mechanism 1030. The protrusions 1026 are located towards an outer side edge of the prongs 1013, 1014. The protrusions 1026 locate within elongate receiving indents 1042 of the sliding cams 1038, 1039. The elongate receiving indents 1042 in the cams 1038, 1039 are shaped such that the protrusions 1026 are constrained to follow the corresponding movement of the cams 1038, 1039, but the cams 1038, 1039 may also slide relative to the protrusions 1026 and prongs 1013, 1014 while still retaining the protrusions 1026 within the elongate receiving indents 1042. This allows the cams 1038, 1039 an additional degree of travel relative to the prongs 1013, 1014.

As a result of this modified internal deployment mechanism 1030, the cam pin 1032 is constrained to follow movement of the cams 1038, 1039. However, the cam pin 1032 can also slide within the slot to allow the cam pin 1032 and the coupled cams 1038, 1039 an additional degree of movement relative to the earth pin 1012. This enables the cam pin 1032 to travel alongside a front face 99 of the power adapter to advantageously enable the dimensions of the power adapter to be minimised as much as possible. Thus, the elongate slot 1088 enables the distance between the cam pin 1032 and the pivot pin 1028 to be varied so that the cam pin 1032 and attached cams 1038, 1039 are not constrained to travel along a fixed arc relative to the pivot pin 1028 during movement between the stowed and deployed configurations. Rather, throughout the transition between the deployed and stowed configurations, the cam pin 1032 is able to slide within the elongate slot 1088 closer to the central axis of the pivot pin 1028, thereby reducing the amount of space required for successful deployment and stowing of the prongs 1012, 1014. As a result of this sliding of the cam pin 1032 within the elongate slot 1088, the cam pin 1032 and attached cams 1038, 1039 travel along a more linear (rather than arcuate) path, alongside the front face 99 of the power adapter.

As shown in FIGS. 73 to 75 and 81 to 89, movement of the sliding cams 1038, 1039 causes corresponding movement of the protrusions 1026, and cam pin 1032 which causes rotation of the prongs 1012, 1013, 1014. The cams 1038, 1039 slidably retain the protrusions 1026 within the elongate pin receiving indents 1042 and the cam pin 1032 is slidable within the elongate slot 1088 to enable a substantially linear movement of the cams 1038, 1039, that translates to a rotational movement of the prongs 1012, 1013, 1014. This arrangement of the internal deployment mechanism 1030 enables the prongs 1012, 1013, 1014 to be moved between the stowed and the deployed configurations in the most space efficient manner.

Centrally located holes within the cams 1038, 1039, can be used to accommodate a biasing means 1098 to bias the cams 1038, 1039 towards a desired position. The biasing means 1098 may include flipping/tipping effect springs such as those described in US2011/0024961, the entire contents of which are incorporate by reference. Any of the previously described actuation mechanisms, such as keys, slide and/or push switches may be used to actuate this alternative deployment mechanism 1030.

Figure 77:
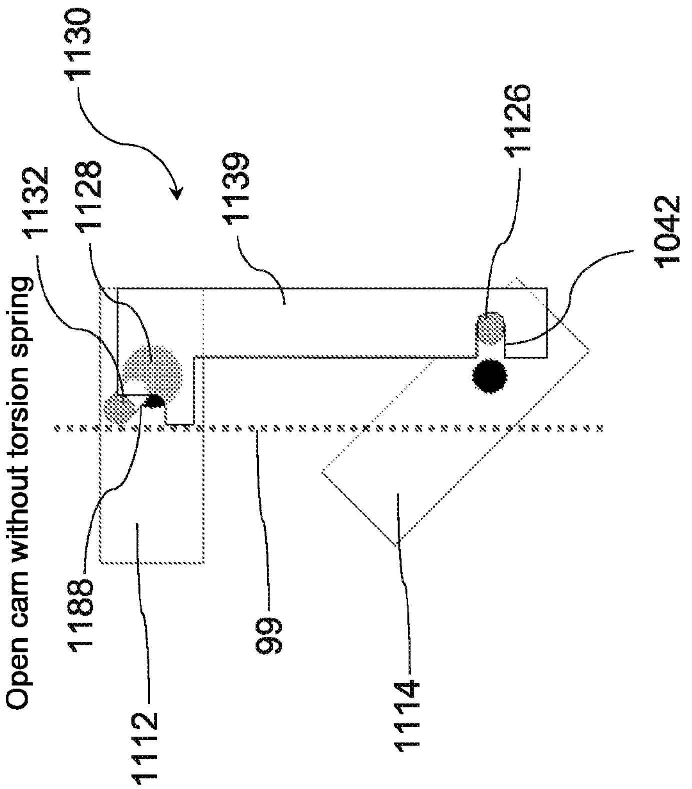
FIGS. 76 and 77 are schematic side views of two prongs and an alternative deployment mechanism comprising an open cam without a spring return.
Figure 76:
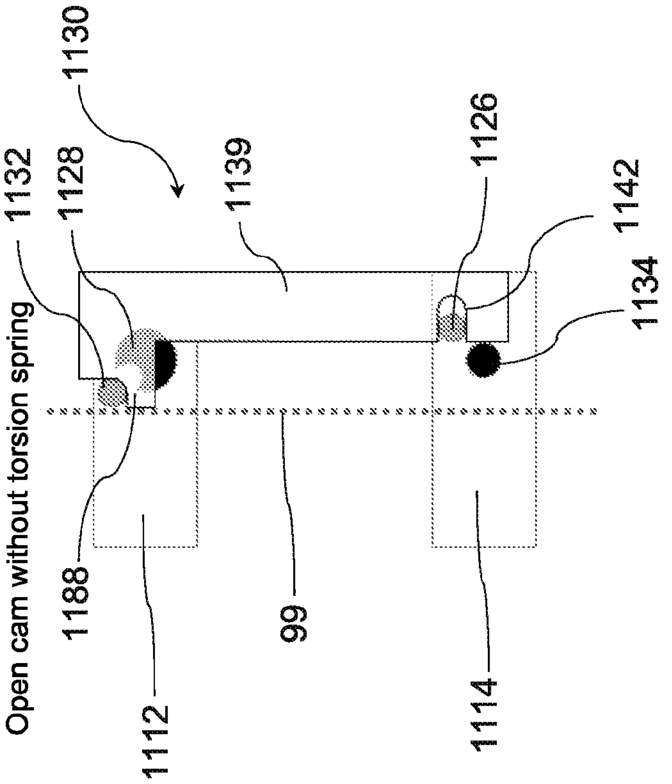

FIGS. 76 and 77 show another embodiment with a different internal deployment mechanism 1130, which instead comprises open cams 1139 (one shown) which provide the means to deploy the earth prong 1112, but with no torsion spring or cam surface to return the earth prong 1112 into the stowed configuration. Separate user intervention would be required to return the earth prong 1112 to the stowed configuration. Otherwise, the internal deployment mechanism 1130 functions as described with reference to the previous embodiment, with the cam pin 1132 having the freedom to slide within the elongate slot 1188 of the earth prong 1112 and the cams 1139 allowing slidable retention of the protrusions 1126 within the elongate receiving indents 1142. Again, this arrangement is advantageous as it represents a space efficient design for the internal deployment mechanism 1130 and enables the dimensions of the adapter to be minimised.

Figure 80:
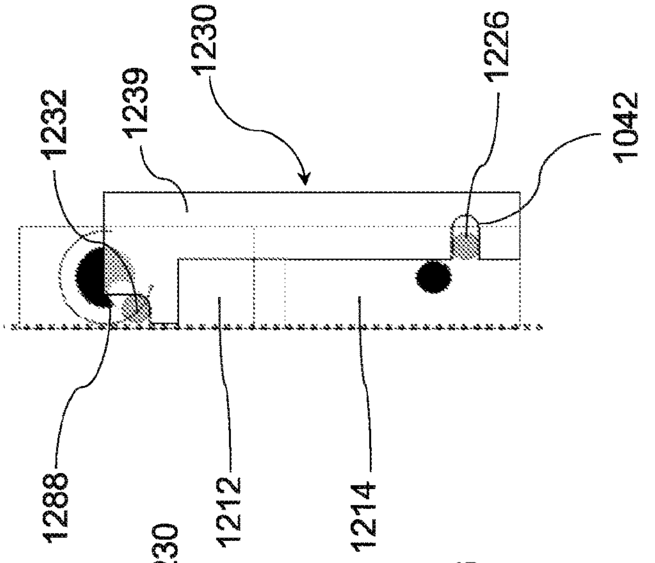
FIGS. 78 to 80 are schematic side views of two prongs and an alternative deployment mechanism comprising an open cam with torsion spring.
Figure 79:
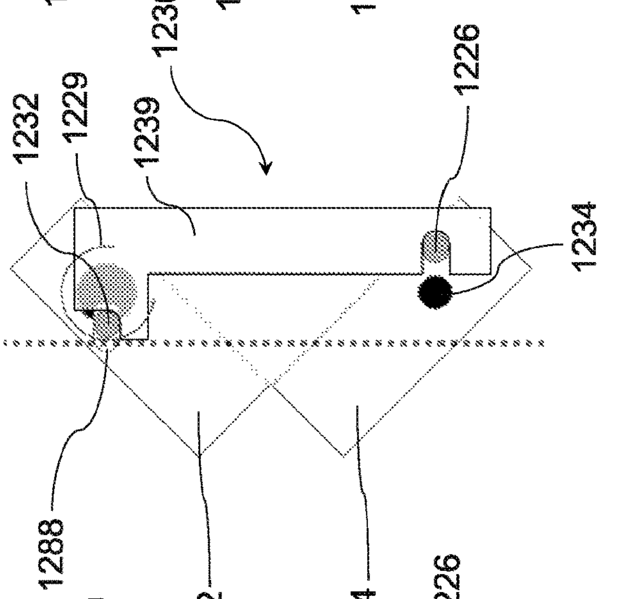
Figure 78:
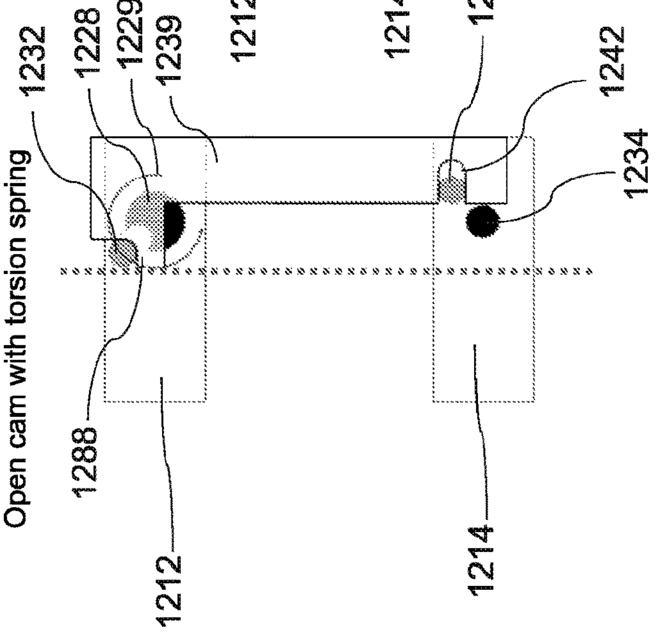
Figure 83:
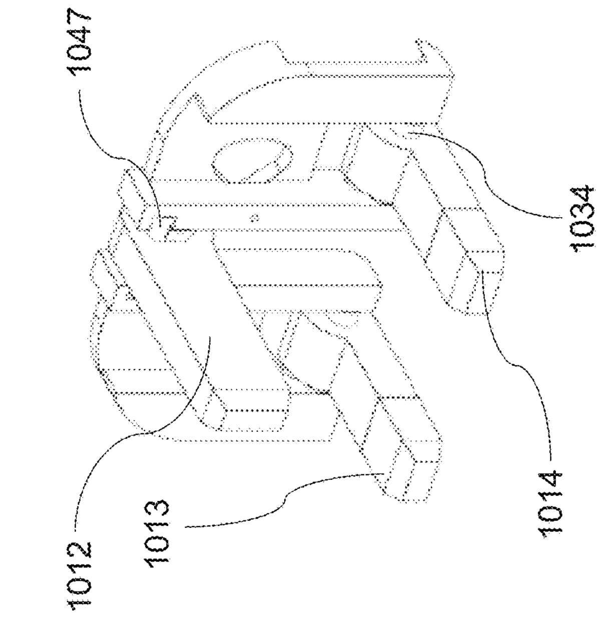
FIGS. 81 to 83 are perspective views of an adapter having the prongs and internal deployment mechanism of the adapter shown in FIGS. 73 to 75 in the fully stowed, transitional and fully deployed configurations respectively.
Figure 82:
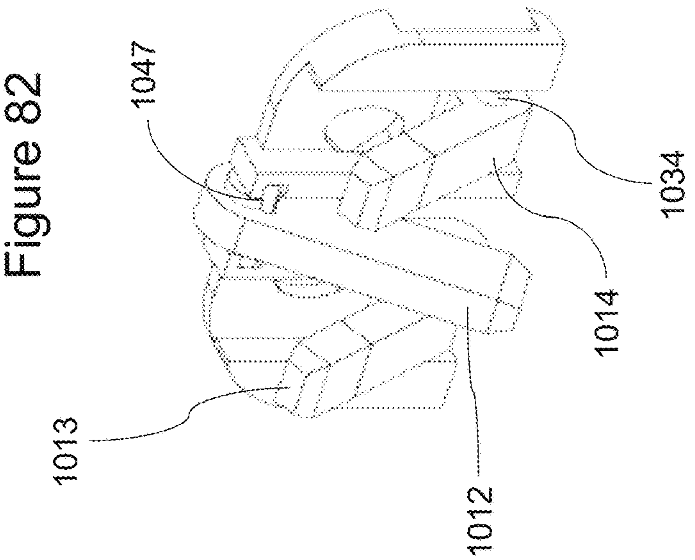
Figure 81:
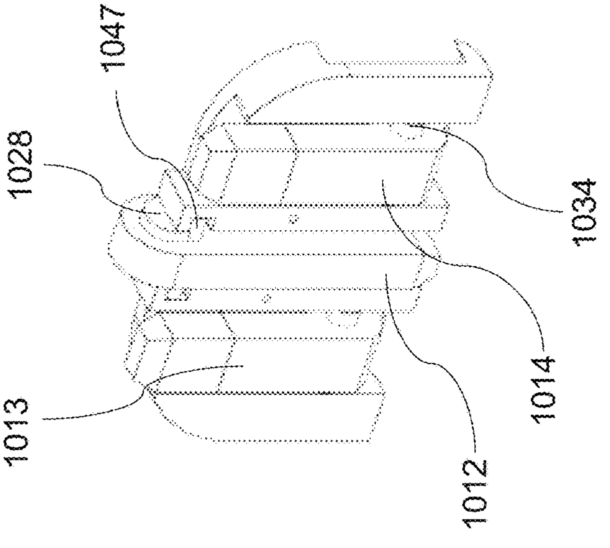
Figures 84, 85, 86, 87, 88, 89:
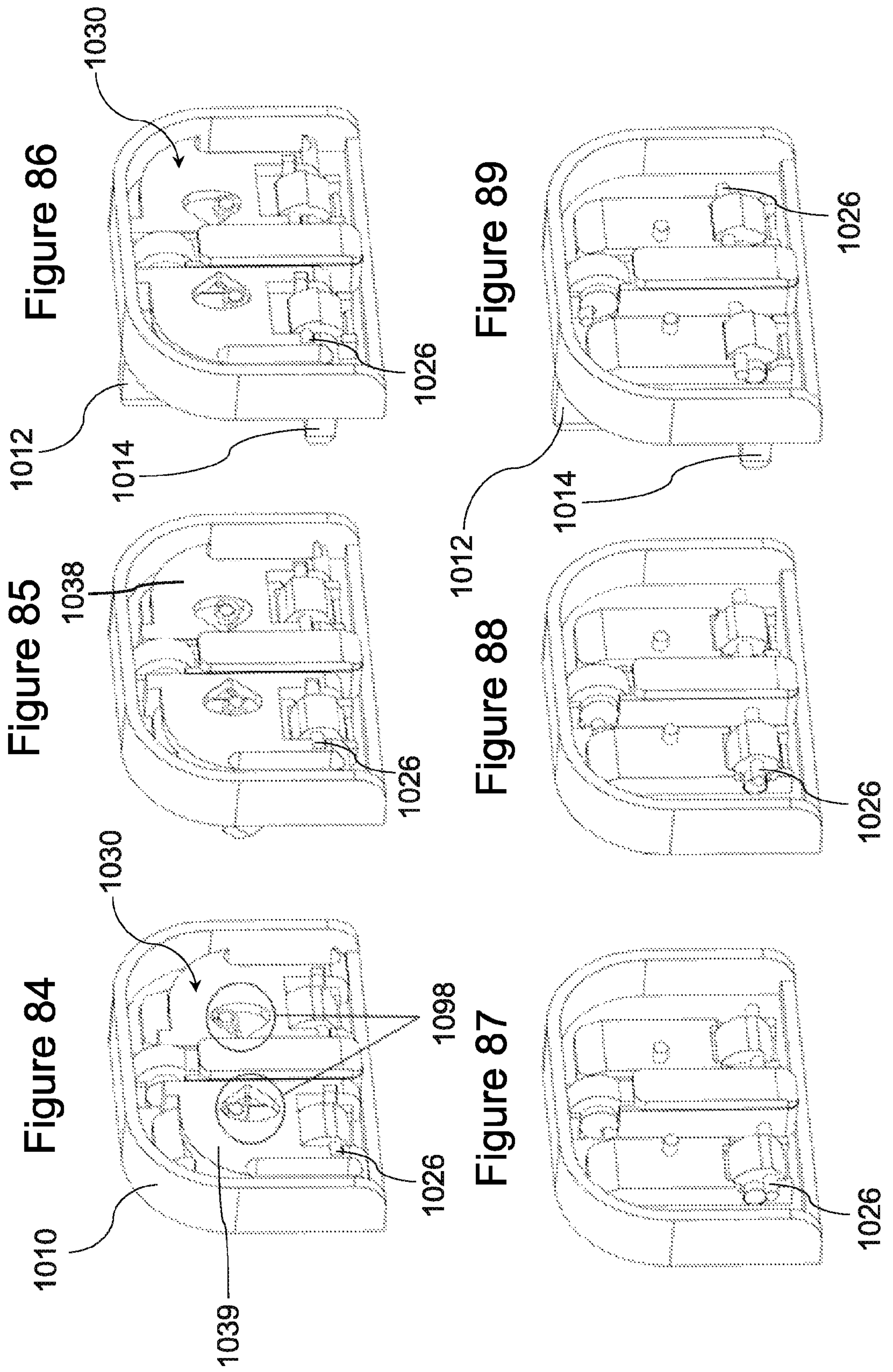
FIGS. 84 to 86 are perspective views of the plug part of the adapter of FIGS. 81 to 83 with the rear cover removed in the fully stowed, transitional and fully deployed configurations respectively.
FIGS. 87 to 89 are perspective views of the plug part with a portion of the internal deployment mechanism removed.

FIGS. 78 to 80 show an adapter similar to that of FIGS. 76 and 77 with an open upper cam 1238 surface in the internal deployment mechanism 1230. However, this embodiment has a torsion spring 1229 associated with the earth prong 1212 to ensure the prong 1212 returns to the stowed configuration once the cam surface is moved away from the protrusion 1247. The internal deployment mechanism 1230 is similar to that described with reference to the two previous embodiments.

Although particular embodiments of the invention have been disclosed herein in detail, this is by way of example and for the purposes of illustration only. The aforementioned embodiments are not intended to be limiting with respect to the scope of the statements of invention and/or appended claims. Relative terms such as "upper" and "lower" aid understanding of the invention but do not limit the scope of the invention.

It is contemplated by the inventors that various substitutions, alterations, and modifications may be made to the invention without departing from the scope of the invention as defined by the statements of invention and/or claims. For example, the prongs 12, 13, 14 or the housing 16 may be of different shapes and dimensions. The foldable power adapters of the invention may be adapted for use with any electronic device in any residential or commercial setting.

The invention claimed is:

1. A power adapter comprising:

a first prong rotatable between a stowed configuration and a deployed configuration;

a second prong rotatable in an opposing direction between the stowed configuration and the deployed configuration;

a deployment mechanism associated with the first and second prongs to cause movement of the prongs between the stowed and the deployed configurations, wherein the deployment mechanism comprises a cam coupled to at least one of the first and second prongs and arranged to act on the other second or first prong such that movement of the cam translates to rotation of the prongs; and an actuation mechanism to actuate movement of the first and second prongs between the stowed and the deployed configurations, wherein the actuation mechanism is directly coupled to the deployment mechanism to cause movement of the first and second prongs on actuation thereof, and wherein the actuation mechanism is spaced from the first and second prongs, such that actuation is initiated by a user remote from the first and second prongs.

2. The power adapter according to claim 1, wherein the deployment mechanism is arranged such that rotation of the first and second prongs is substantially simultaneous.

3. The power adapter according to claim 1, wherein the cam is movable in a linear manner and wherein the cam is coupled to, and/or is arranged to act on, the first and second prongs at a location offset from an axis of rotation of each of the prongs.

4. The power adapter according to claim 1, wherein the cam is coupled to one of the first and/or second prongs and acts on the other prong to move the prong from the stowed to the deployed configuration and wherein the cam is provided with a cam surface arranged to act on one of the second or first prongs and guide movement of the prong along a predetermined path.

5. The power adapter according to claim 1, wherein the deployment mechanism further comprises a biasing element associated with at least one of the prongs to return the prong to a particular configuration when the cam is not acting directly on the prong.

6. The power adapter according to claim 1, wherein the cam is directly coupled to both the first and second prongs to control rotational movement of the prongs between the stowed and deployed configurations.

7. The power adapter according to claim 1, wherein the prongs are provided with protrusions for directly engaging and/or interacting with the cam of the deployment mechanism.

8. The power adapter according to claim 1, wherein the deployment mechanism comprises a resilient element arranged to act on the cam and bias the cam into a particular position.

9. The power adapter according to claim 1, wherein the adapter comprises two second prongs and two cams, the cams each being slidable cams, wherein the second prongs are rotatable around a common axis between the stowed and deployed configurations, and wherein each second prong is coupled to one of the slidable cams such that movement of each cam is directly translated to the respective second prong.

10. The power adapter according to claim 1, wherein the power adapter comprises a housing that is arranged to contain the deployment mechanism and retain the first and second prongs, wherein the housing defines recesses for accommodating the first and second prongs such that the prongs remain within an area defined by the housing in the stowed configuration.

11. The power adapter according to claim 1, wherein the actuation mechanism is directly coupled to the cam of the deployment mechanism such that actuation causes direct movement of the cam of the deployment mechanism.

12. The power adapter according to claim 1, wherein the power adapter comprises a first part containing the first and second prongs and the deployment mechanism, and a second part containing an electrical output, wherein the first and second parts are movably coupled and wherein relative movement of the first and second parts causes actuation of the deployment mechanism.

13. A computer-readable medium having computer-executable instructions adapted to cause a 3D printer to print the power adapter according to claim 1.

14. A power transfer system comprising an electronic device that is electrically connectable with the power adapter according to claim 1.

15. A power adapter comprising:

a plug part including at least two prongs rotatable between a stowed configuration and a deployed configuration;

an adapter part for providing an electrical output; and a movable coupling for selective mechanical and electrical coupling of the adapter part and the plug part, wherein the plug part and the adapter part are movable between a first position in which the prongs are in the stowed configuration and a second position in which the prongs are in the deployed configuration such that movement of the adapter part and the plug part between the first and second positions causes rotation of the prongs between the stowed and deployed configurations.

16. The power adapter according to claim 15, wherein the plug part comprises a plug housing and the adapter part comprises an adapter housing and wherein the plug housing and the adapter housing are shaped such that the power adapter is substantially cuboid in the second position, with the prongs deployed and projecting outwardly from a face of the cuboid.

17. The power adapter according to claim 15, wherein the adapter comprises a slidable coupling such that the plug part and the adapter part are coupled to one another and slidable between the first and second positions.

18. A kit of parts for a power adapter, the kit of parts comprising the plug part and the adapter part according to claim 15.

* * * * *